(12) United States Patent
Gerszberg et al.

(10) Patent No.: US 8,355,365 B2
(45) Date of Patent: *Jan. 15, 2013

(54) HYBRID FIBER TWISTED PAIR LOCAL LOOP NETWORK SERVICE ARCHITECTURE

(75) Inventors: Irwin Gerszberg, Kendall Park, NJ (US); Robert Raymond Miller, II, Morris Township, Morris County, NJ (US); Dennis Matthew Romain, Convent Station, NJ (US); Jesse Eugene Russell, Piscataway, NJ (US); Philip Andrew Treventi, Murray Hill, NJ (US)

(73) Assignee: AT&T Intellectual Property II, L.P., Atlanta, GA (US)

( * ) Notice: Subject to any disclaimer, the term of this patent is extended or adjusted under 35 U.S.C. 154(b) by 369 days.

This patent is subject to a terminal disclaimer.

(21) Appl. No.: 12/653,715

(22) Filed: Dec. 17, 2009

(65) Prior Publication Data

US 2010/0098000 A1    Apr. 22, 2010

Related U.S. Application Data

(63) Continuation of application No. 12/315,349, filed on Dec. 2, 2008, now Pat. No. 7,672,298, which is a continuation of application No. 11/068,605, filed on Feb. 28, 2005, now Pat. No. 7,466,695, which is a continuation of application No. 10/005,153, filed on Dec. 7, 2001, now Pat. No. 6,885,662, which is a continuation of application No. 09/001,360, filed on Dec. 31, 1997, now Pat. No. 6,359,881.

(51) Int. Cl.
*H04Q 7/00* (2006.01)

(52) U.S. Cl. .................................... 370/328

(58) Field of Classification Search .................. None
See application file for complete search history.

(56) References Cited

U.S. PATENT DOCUMENTS

| | | | |
|---|---|---|---|
| 4,456,925 A | 6/1984 | Skerlos et al. |
| 4,620,289 A | 10/1986 | Chauvel |
| 4,725,694 A | 2/1988 | Auer et al. |
| 4,760,442 A | 7/1988 | O'Connell et al. |
| 4,916,441 A | 4/1990 | Gombrich |
| 5,014,267 A | 5/1991 | Tompkins et al. |
| 5,157,717 A | 10/1992 | Hitchcock |
| 5,335,276 A | 8/1994 | Thompson et al. |
| 5,393,964 A | 2/1995 | Hamilton et al. |
| 5,406,615 A | 4/1995 | Miller, II et al. |

(Continued)

*Primary Examiner* — Hassan Phillips
*Assistant Examiner* — Prenell Jones

(57) ABSTRACT

A new architecture capable of utilizing the existing twisted pair interface between customer premises equipment and an associated serving local switching office is used to provide a vast array of new services to customers. Using an intelligent services director (ISD) at the customer services equipment as an interface for the equipment to an existing twisted cable pair and a facilities management platform (FMP) at the serving local switching office as an interface to various networks and service opportunities, new services such as simultaneous, multiple calls (voice analog or digital), facsimile, Internet traffic and other data can be transmitted and received over the twisted cable pair by using digital subscriber loop transmission schemes. The new services include but are not limited to videophone, utility meter reading and monitoring, broadcasting and multicasting. The architecture provides for fault-tolerant, transparent interaction of components and services and supports a variety of standards for each level of the open systems interconnection layers and layers of TCP/IP. The FMP connects electronically or optically to the public switched telephone network, Internet backbone, a private Intranet as well as other possible network connections.

17 Claims, 21 Drawing Sheets

U.S. PATENT DOCUMENTS

| | | | |
|---|---|---|---|
| 5,410,343 A | 4/1995 | Coddington et al. | |
| 5,428,608 A | 6/1995 | Freeman et al. | |
| 5,488,412 A | 1/1996 | Majeti et al. | |
| 5,512,935 A | 4/1996 | Majeti et al. | |
| 5,534,913 A | 7/1996 | Majeti et al. | |
| 5,541,917 A | 7/1996 | Farris | |
| 5,546,316 A | 8/1996 | Buckley et al. | |
| 5,561,604 A | 10/1996 | Buckley et al. | |
| 5,572,005 A | 11/1996 | Hamilton et al. | |
| 5,583,965 A | 12/1996 | Douma et al. | |
| 5,584,054 A | 12/1996 | Tyneski et al. | |
| 5,587,735 A | 12/1996 | Ishida et al. | |
| 5,592,477 A | 1/1997 | Farris et al. | |
| 5,619,684 A | 4/1997 | Goodwin et al. | |
| 5,644,628 A | 7/1997 | Schwarzer et al. | |
| 5,671,267 A | 9/1997 | August et al. | |
| 5,682,195 A | 10/1997 | Hendricks et al. | |
| 5,684,918 A | 11/1997 | Abecassis | |
| 5,864,415 A | 1/1999 | Williams et al. | |
| 5,889,856 A | 3/1999 | O'Toole et al. | |
| 5,917,537 A | 6/1999 | Lightfoot et al. | |
| 5,991,311 A * | 11/1999 | Long et al. | 370/524 |
| 6,061,326 A | 5/2000 | Miller, II et al. | |
| 6,111,895 A | 8/2000 | Miller, II et al. | |
| 6,160,843 A | 12/2000 | McHale et al. | |
| 6,314,102 B1 * | 11/2001 | Czerwiec et al. | 370/395.6 |
| 6,359,881 B1 | 3/2002 | Gerszberg et al. | |
| 7,145,898 B1 * | 12/2006 | Elliott | 370/352 |
| 2001/0001268 A1 * | 5/2001 | Menon et al. | 370/329 |
| 2002/0089958 A1 * | 7/2002 | Feder et al. | 370/338 |
| 2006/0039364 A1 * | 2/2006 | Wright | 370/352 |
| 2008/0304475 A1 * | 12/2008 | Gerszberg et al. | 370/354 |

* cited by examiner

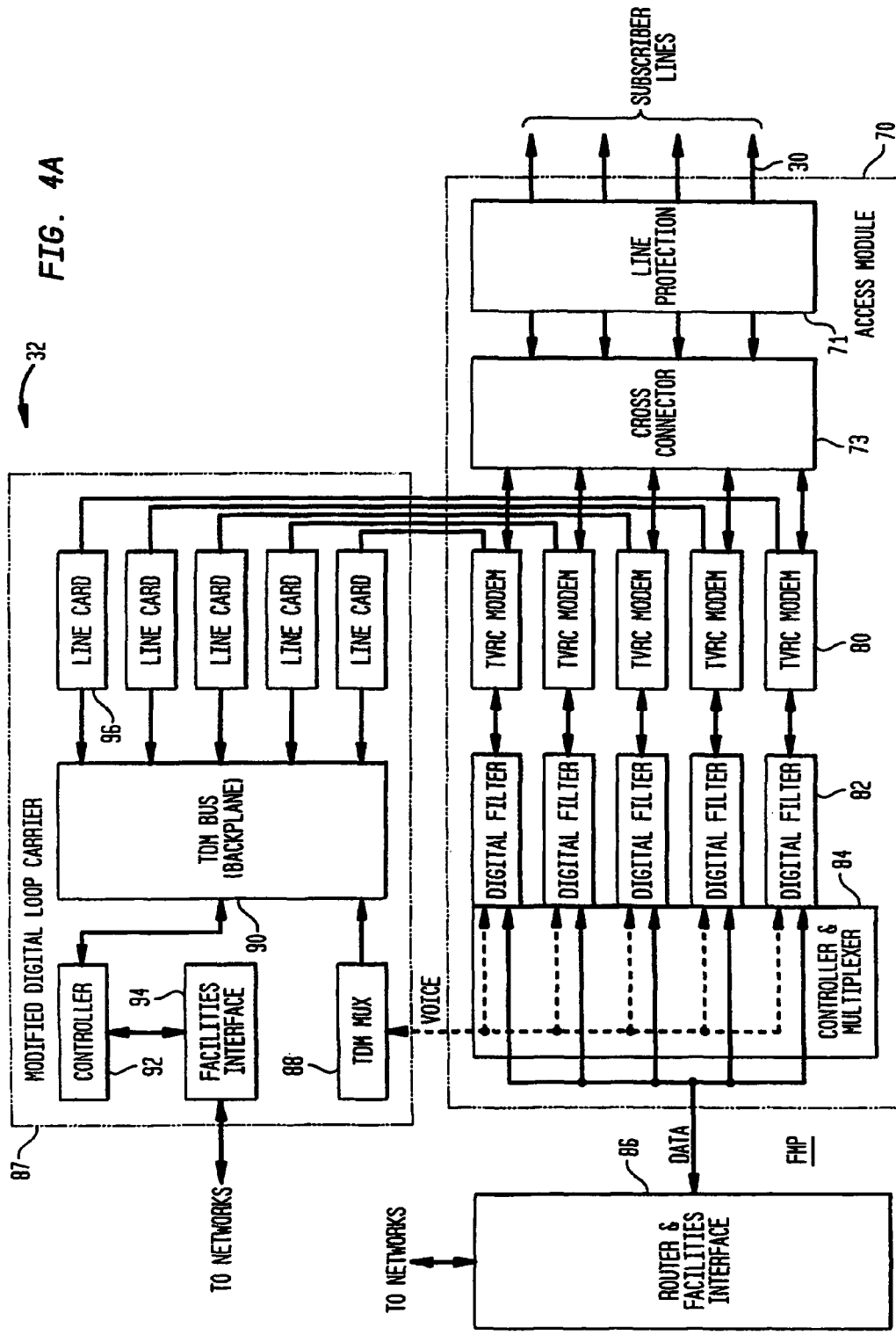

HYBRID FIBER TWISTED PAIR LOCAL LOOP NETWORK SERVICE ARCHITECTURE

This application is a continuation of application Ser. No. 12/315,349, filed on Dec. 2, 2008, and entitled "Hybrid Fiber Twisted Pair Local Loop Network Service Architecture," which issued on Mar. 2, 2010 as U.S. Pat. No. 7,672,298, which is a continuation of application Ser. No. 11/068,605, filed on Feb. 28, 2005, and entitled "Hybrid Fiber Twisted Pair Local Loop Network Service Architecture," which issued on Dec. 16, 2008 as U.S. Pat. No. 7,466,695, which is a continuation of U.S. patent application Ser. No. 10/005,153, filed Dec. 7, 2001, which issued on Apr. 26, 2005 as U.S. Pat. No. 6,885,662, which is a continuation of U.S. patent application Ser. No. 09/001,360, filed Dec. 31, 1997, and entitled "Hybrid Fiber Twisted Pair Local Loop Network Service Architecture," which issued on Mar. 19, 2002 as U.S. Pat. No. 6,359,881. This application is related to application Ser. No. 12/228,341, filed on Aug. 12, 2008.

This invention discloses an architecture for supporting increased bandwidth to customer premises equipment allowing for increased services including videophone, analog and digital voice traffic, facsimile, voice mail, Internet traffic, and automated home services relating to meter reading, security, and energy management.

FIELD OF THE INVENTION

Background of the Invention

As deregulation of the telephone industry continues and as companies prepare to enter the local telephone access, market, there is a need to offer new and innovative services that distinguish common carriers from their competitors. This cannot be accomplished without introducing new local access network architectures that will be able to support these new and innovative services.

Conventionally, customer premises telephone and/or data connections contain splitters for separating analog voice calls from other data services such as Ethernet transported over digital subscriber line (DSL) modems. Voice band data and voice signals are sent through a communications switch in a central or local office to an interexchange carrier or Internet service provider. DSL data is sent through a digital subscriber loop asynchronous mode (DSLAM) switch which may include a router. The DSLAM switch connects many lines and routes the digital data to a telephone company's digital broadband switch.

A major problem with this configuration is that as the interexchange carriers attempt to penetrate the local telephone company's territory, they must lease trunk lines from the local telephone company switch to the interexchange company's network for digital traffic. Furthermore, the Internet service provider must lease a modem from the local phone company in the DSLAM switch and route its data through the local phone company's digital broadband switch. Thus, the local phone company leases and/or provides a significant amount of equipment, driving up the cost of entry for any other company trying to provide local telephone services and making it difficult for the interexchange companies to differentiate their services. Furthermore, since DSL modem technology is not standardized, in order to ensure compatibility, the DSL modem provided by the local telephone company must also be provided to the end user in the customer premises equipment (CPE). Additionally, since the network is not completely controlled by the interexchange companies, it is difficult for the interexchange companies to provide data at committed delivery rates. Any performance improvements implemented by the interexchange companies may not be realized by their customers, because the capabilities of the local telephone company equipment may or may not meet their performance needs. Thus, it is difficult for the interexchange companies to convince potential customers to switch to their equipment or to use their services. These factors ensure the continued market presence of the local telephone company.

As part of this system, there is a need for improved architectures, services and equipment utilized to distinguish the interexchange companies' products and services. The existing copper twisted pair infrastructure limits the number of users on the twisted pair and the bandwidth transmitted. A method for expanding the number of simultaneous users and the bandwidth without replacing the existing twisted pair infrastructure is desired. In increasing the bandwidth and the number of simultaneous services transmitted over a single twisted pair will allow service providers an opportunity to expand and enhance services into consumers' homes and business operations while minimizing the incremental costs associated with initiating enhanced, new services.

In the process of providing enhanced, new services, it is desired for the service provider to offer fault tolerant, transparent interfaces for the user. Because of the need to keep costs minimized, flexibility for using existing hardware and software systems is important. Therefore, it is also desired that the fault tolerant services offered be flexible to interface across multiple lines of hardware and various versions of software.

SUMMARY OF THE INVENTION

In order to provide an improved network, it is desirable for the interexchange companies to have access to at least one of the twisted-pair lines or alternate wireless facility connecting each of the individual users to the local telephone network before the lines are routed through the conventional local telephone network equipment. It is preferable to have access to these lines prior to the splitter and modem technology offered by the local service providers. By having access to the twisted-pair wires entering the customer's premises, interexchange companies can differentiate their services by providing higher bandwidth, improving the capabilities of the customer premises equipment, and lowering overall system costs to the customer by providing competitive service alternatives.

The new architecture may utilize a video phone and/or other devices to provide new services to an end user; an intelligent services director (ISD) disposed near the customer's premises for multiplexing and coordinating many digital services onto a single twisted-pair line; a facilities management platform (FMP) disposed in the local telephone network's central office or DLC vault for routing data to an appropriate interexchange company network; and a network server platform (NSP) coupled to the FMP for providing new and innovative services to the customer and for distinguishing services provided by the interexchange companies from those services provided by the local telephone network.

The overall architecture of the system includes a hybrid optical fiber/twisted pair infrastructure functionally coupling the customer premises equipment to the facilities management platform by twisted pair operating xDSL technology. The utilization of xDSL technology increases the bandwidth to the customer premises equipment and allows for the offering of simultaneous services along the same twisted pair.

The facilities management platform is functionally coupled to a communication network and is supported by a network server platform. Typically, the facilities management platform is located at the local office, while the network server platform is located in a separate location due to space limitations, regulator considerations and/or costs at the local office. The architecture provides variable bandwidth channels, depending on the service requested by the subscriber, and may be dynamically adapted for providing requested services in both directions of transmission. Voice and data are intelligently multiplexed in order to maximize the available bandwidth of the twisted pair.

The facilities management platform supports both fiber and wire connections into the local telephone company's communication network, cable television network, Internet service provider's network or into a wireless communication's network.

BRIEF DESCRIPTION OF THE DRAWINGS

The foregoing summary of the invention, as well as the following detailed description of preferred embodiments, is better understood when read in conjunction with the accompanying drawings, which are included by way of example, and not by way of limitation with regard to the claimed invention.

FIG. 4A is a block diagram of an embodiment of a facilities management platform consistent with the architecture shown in FIG. 1.

DETAILED DESCRIPTION OF THE INVENTION

Figure 1:
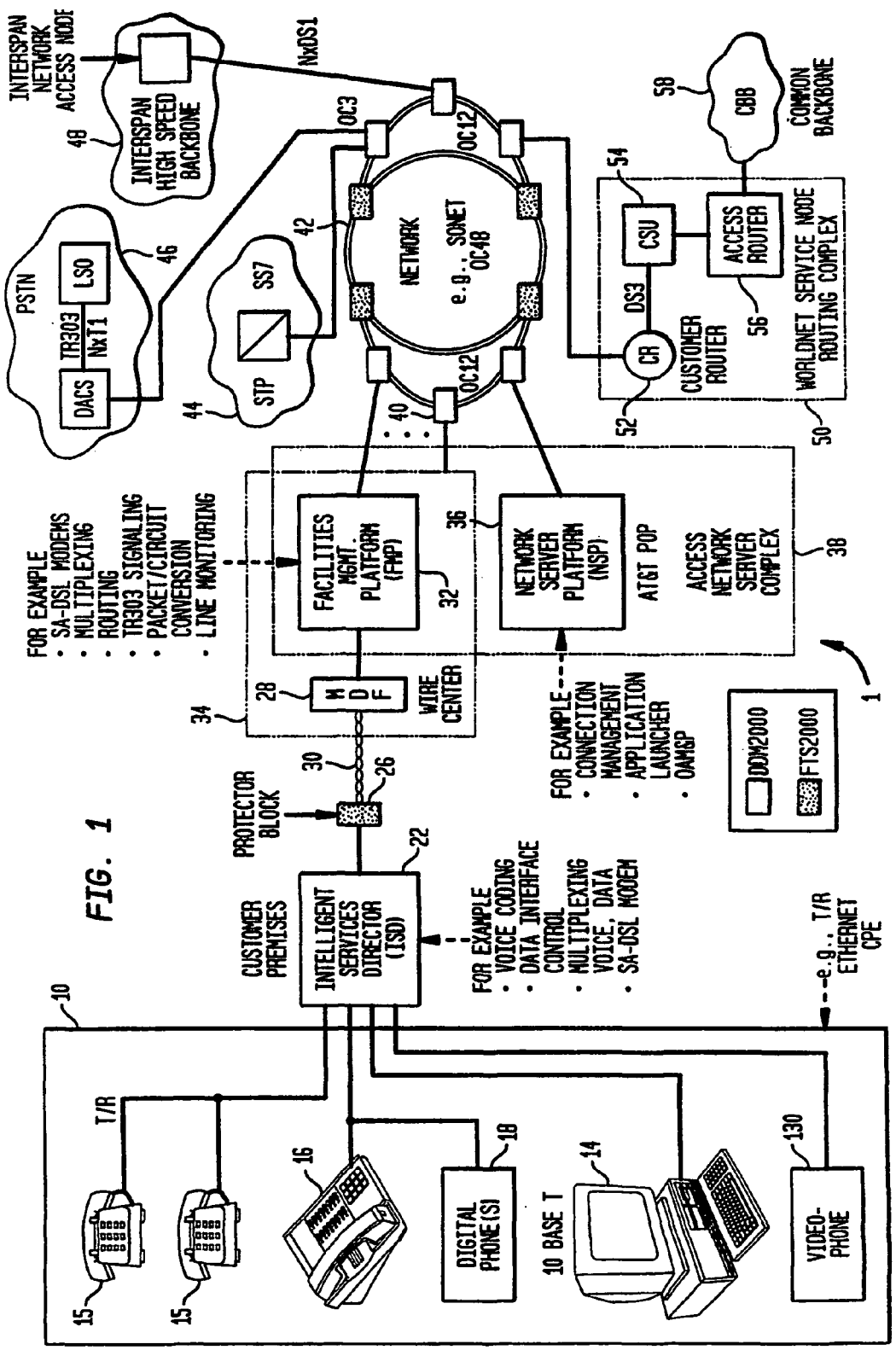
FIG. 1 illustrates an embodiment of a hybrid fiber twisted pair local loop architecture.

The following applications are hereby incorporated by reference:

1. A Hybrid Fiber Twisted-pair Local Loop Network Service Architecture, U.S. application Ser. No. 09/001,360, filed Dec. 31, 1997;

2. Dynamic Bandwidth Allocation for use in the Hybrid Fiber Twisted-pair Local Loop Network Service Architecture, U.S. application Ser. No. 09/001,425, filed Dec. 31, 1997, and issued as U.S. Pat. No. 6,307,839 on Oct. 23, 2001;

3. The VideoPhone, U.S. application Ser. No. 09/001,905, filed Dec. 31, 1997;

4. VideoPhone Privacy Activator, U.S. application Ser. No. 09/001,909, filed Dec. 31, 1997;

5. VideoPhone Form Factor, U.S. application Ser. No. 09/001,583, filed Dec. 31, 1997;

6. VideoPhone Centrally Controlled User Interface With User Selectable Options, U.S. application Ser. No. 09/001,576, filed Dec. 31, 1997;

7. VideoPhone User Interface Having Multiple Menu Hierarchies, U.S. application Ser. No. 09/001,908, filed Dec. 31, 1997;

8. VideoPhone Blocker, U.S. application Ser. No. 09/001,353, filed Dec. 31, 1997, and issued as U.S. Pat. No. 5,949,474 on Sep. 7, 1999;

9. VideoPhone Inter-corn For Extension Phones, U.S. application Ser. No. 09/001,358, filed Dec. 31, 1997;

10. Advertising Screen Saver, U.S. application Ser. No. 09/001,574, filed Dec. 31, 1997, and issued as U.S. Pat. No. 6,084,583 on Jul. 4, 2000;

11. VideoPhone FlexiView Advertising Information Display for a Visual Communication Device, U.S. application Ser. No. 09/001,906, filed Dec. 31, 1997, and issued as U.S. Pat. No. 6,222,520 on Apr. 24, 2001;

12. VideoPhone Multimedia Announcement Answering Machine, U.S. application Ser. No. 09/001,911, filed Dec. 31, 1997;

13. VideoPhone Multimedia Announcement Message Toolkit, U.S. application Ser. No. 09/001,345, filed Dec. 31, 1997;

14. VideoPhone Multimedia Video Message Reception, U.S. application Ser. No. 09/001,362, filed Dec. 31, 1997;

15. VideoPhone Multimedia Interactive Corporate Menu Answering Machine Announcement, U.S. application Ser. No. 09/001,574, filed Dec. 31, 1997, and issued as U.S. Pat. No. 6,084,583 on Jul. 4, 2000;

16. VideoPhone Multimedia Interactive On-Hold Information Menus, U.S. application Ser. No. 09/001,356, filed Dec. 31, 1997, and issued as U.S. Pat. No. 6,020,916 on Feb. 1, 2000;

17. VideoPhone Advertisement When Calling Video Non-enabled VideoPhone Users, U.S. application Ser. No. 09/001,361, filed Dec. 31, 1997;

18. Motion Detection Advertising, U.S. application Ser. No. 09/001,355, filed Dec. 31, 1997;

19. Interactive Commercials, U.S. application Ser. No. 09/001,578, filed Dec. 31, 1997, and issued as U.S. Pat. No. 6,178,446 on Jan. 23, 2001;

20. Video communication device providing in-home catalog services, U.S. application Ser. No. 09/001,421, filed Dec. 31, 1997, and issued as U.S. Pat. No. 5,970,473 on Oct. 19, 1999;

21. A Facilities Management Platform For Hybrid Fiber Twisted-pair Local Loop Network, Service Architecture, U.S. application Ser. No. 09/001,422, filed Dec. 31, 1997;

22. Life Line Support for Multiple Service Access on Single Twisted-pair, U.S. application Ser. No. 09/001,343, filed Dec. 31, 1997;
23. A Network Server Platform (NSP) For a Hybrid Fiber Twisted-pair (HFTP) Local Loop Network Service Architecture, U.S. application Ser. No. 09/001,582, filed Dec. 31, 1997, and issued as U.S. Pat. No. 6,229,810 on May 8, 2001;
24. A Communication Server Apparatus For Interactive Commercial Service, U.S. application Ser. No. 09/001,344, filed Dec. 31, 1997;
25. NSP Multicast, PPV Server NSP Based Multicast Digital Program Delivery Services, U.S. application Ser. No. 09/001,580, filed Dec. 31, 1997;
26. NSP Internet, JAVA Server and VideoPhone Application Server, U.S. application Ser. No. 09/001,354, filed Dec. 31, 1997, and issued as U.S. Pat. No. 6,044,403 on Mar. 28, 2000;
27. NSP WAN Interconnectivity Services for Corporate Telecommuters Telecommuting, U.S. application Ser. No. 09/001,540, filed Dec. 31, 1997;
28. NSP Telephone Directory White-Yellow Page Services, U.S. application Ser. No. 09/001,426, filed Dec. 31, 1997, and issued as U.S. Pat. No. 6,052,439 on Apr. 18, 2000;
29. NSP Integrated Billing System For NSP services and Telephone services, U.S. application Ser. No. 09/001,359, filed Dec. 31, 1997;
30. Network Server Platform/Facility Management Platform Caching Server, U.S. application Ser. No. 09/001,419, filed Dec. 31, 1997;
31. An Integrated Services Director (ISD) Overall Architecture, U.S. application Ser. No. 09/001,417, filed Dec. 31, 1997;
32. ISD/VideoPhone (Customer Premises) Local House Network, U.S. application Ser. No. 09/001,418, filed Dec. 31, 1997;
33. ISD Wireless Network, U.S. application Ser. No. 09/001,363, filed Dec. 31, 1997;
34. ISD Controlled Set-Top Box, U.S. application Ser. No. 09/001,424, filed Dec. 31, 1997;
35. Integrated Remote Control and Phone, U.S. application Ser. No. 09/001,423, filed Dec. 31, 1997;
36. Integrated Remote Control and Phone User Interface, U.S. application Ser. No. 09/001,420, filed Dec. 31, 1997, and issued as U.S. Pat. No. 6,292,210 on Sep. 18, 2001;
37. Integrated Remote Control and Phone Form Factor, U.S. application Ser. No. 09/001,910, filed Dec. 31, 1997;
38. VideoPhone Mail Machine, U.S. Provisional application Ser. No. 60/070,104, filed Dec. 31, 1997;
39. Restaurant Ordering Via VideoPhone, U.S. Provisional application Ser. No. 60/070,121, filed Dec. 31, 1997;
40. Ticket Ordering Via VideoPhone, U.S. application Ser. No. 09/218,171, filed Dec. 31, 1997;
41. Multi-Channel Parallel/Serial Concatenated Convolutional Codes And Trellis Coded Modulation Encode/Decoder, U.S. application Ser. No. 09/001,342, filed Dec. 31, 1997, and issued as U.S. Pat. No. 6,088,387 on Jul. 11, 2000;
42. Spread Spectrum Bit Allocation Algorithm, U.S. application Ser. No. 09/001,842, filed Dec. 31, 1997;
43. Digital Channelizer With Arbitrary Output Frequency, U.S. application Ser. No. 09/001,581, filed Dec. 31, 1997;
44. Method And Apparatus For Allocating Data Via Discrete Multiple Tones, U.S. application Ser. No. 08/997,167, filed Dec. 23, 1997 and issued as U.S. Pat. No. 6,134,274 on Oct. 17, 2000;
45. Method And Apparatus For Reducing Near-End Cross Talk In Discrete Multi-Tone Modulators/Demodulators, U.S. application Ser. No. 08/997,176, filed Dec. 31, 1997, and issued as U.S. Pat. No. 6,144,695 on Nov. 7, 2000;

The present application is listed as #1.

Referring to FIG. 1, a first exemplary communication network architecture employing a hybrid fiber, twisted-pair (HFTP) local loop 1 architecture is shown. An intelligent services director (ISD) 22 may be coupled to a central office 34 via a twisted-pair wire, hybrid fiber interconnection, wireless and/or other customer connection 30, a connector block 26, and/or a main distribution frame (MDF) 28. The ISD 22 and the central or local office 34 may communicate with each other using, for example, framed, time division, frequency-division, synchronous, asynchronous and/or spread spectrum formats, but in exemplary embodiments uses DSL modem technology. The central office 34 preferably includes a facilities management platform (FMP) 32 for processing data exchanged across the customer connection 30. The FMP 32 may be configured to separate the plain old telephone service (POTS) from the remainder of the data on the customer connection 30 using, for example, a tethered virtual radio channel (TVRC) modem (shown in FIG. 4A). The remaining data may be output to a high speed backbone network (e.g., a fiber optic network) such as an asynchronous transfer mode (ATM) switching network. The analog POTS data may be output directly to a public switch telephone network (PSTN) 46, and/or it may be digitized, routed through the high speed backbone network, and then output to the PSTN 46.

The FMP 32 may process data and/or analog/digitized voice between customer premise equipment (CPE) 10 and any number of networks. For example, the FMP 32 may be interconnected with a synchronous optical network (SONET) 42 for interconnection to any number of additional networks such as an InterSpan backbone 48, the PSTN 46, a public switch switching network (e.g. call setup SS7-type network 44), and/or a network server platform (NSP) 36. Alternatively, the FMP 32 may be directly connected to any of these networks. One or more FMPs 32 may be connected directly to the high speed backbone network (e.g., direct fiber connection with the SONET network 42) or they may be linked via a trunk line (e.g., trunks 40 or 42) to one or more additional networks.

The NSP 36 may provide a massive cache storage for various information that may be provided across the SONET net 42 to the FMP 32 and out to the ISD 22. The NSP 36 and the FMP 32 may collectively define an access network server complex 38. The NSP 36 may be interconnected with multiple FMPs 32. Furthermore, each FMP 32 may interconnect with one or more ISDs 22. The NSP 36 may be located anywhere but is preferably located in a point-of-presence (POP) facility. The NSP 36 may further act as a gateway to, for example, any number of additional services.

The ISD 22 may be interconnected to various devices such as a videophone 130, other digital phones 18, set-top devices, computers, and/or other devices comprising the customer premise equipment 10. The customer premise equipment may individually or collectively serve as a local network computer at the customer site. Application applets may be downloaded from the NSP 36 into some or all of the individual devices within the customer premise equipment 10. Where applets are provided by the NSP 36, the programming of the applets may be updated such that the applets are continually configured to the latest software version by the interexchange carrier. In this way, the CPE 10 may be kept up to date by simply re-loading updated applets. In addition, certain applets may be resident on any of the CPE 10. These resident applets may be periodically reinitialized by simply sending a request from, for example, a digital phone 18 and/or a videophone 130 to the FMP 32 and thereafter to the NSP 36 for reinitialization and downloading of new applets. To ensure widespread availability of the new features made possible by the present architecture, the customer premise equipment may be provided to end users either at a subsidized cost or given away for free, with the cost of the equipment being amortized over the services sold to the user through the equipment.

Figure 2:
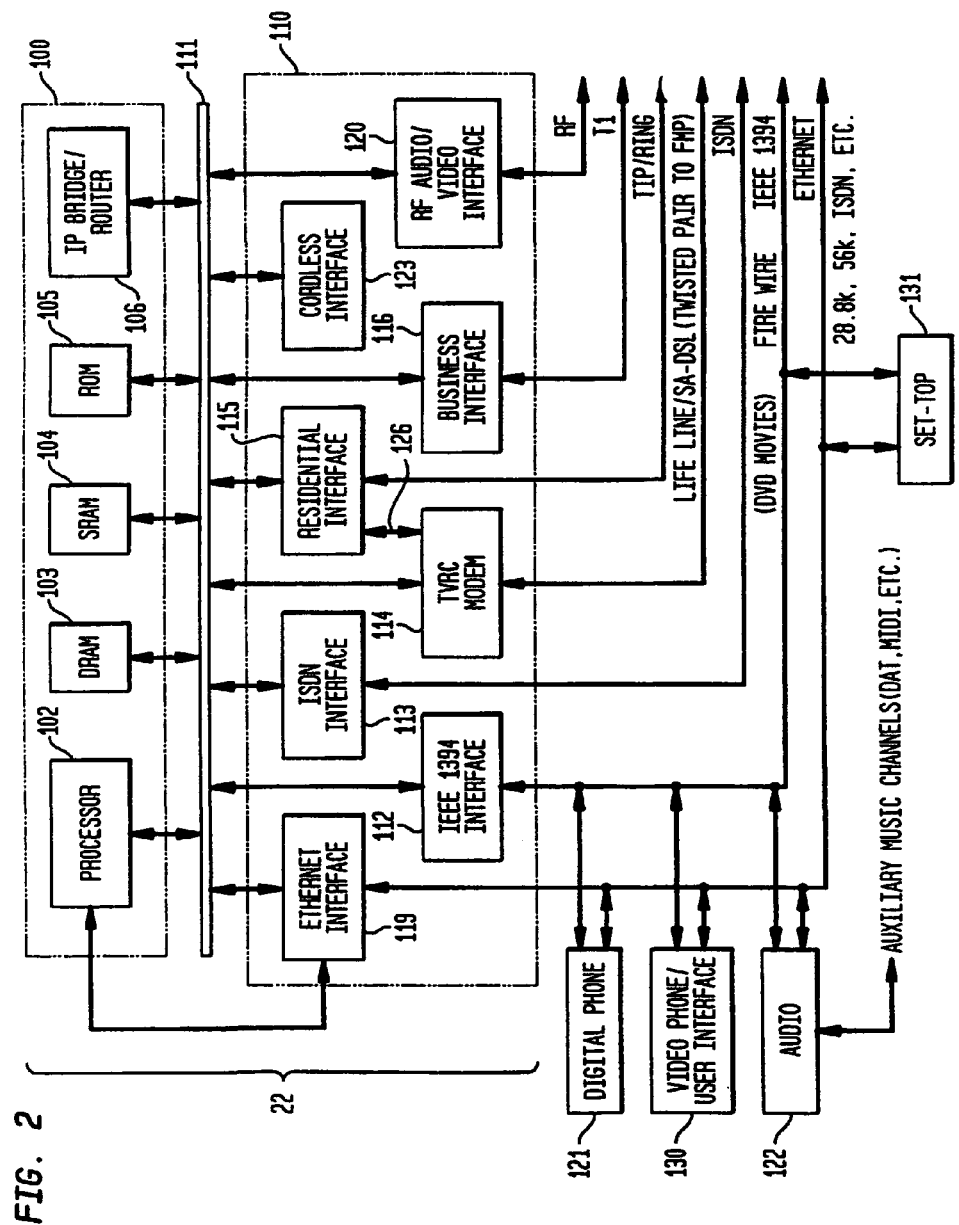
FIG. 2 is a block diagram of an embodiment of an intelligent services director consistent with the architecture shown in FIG. 1.

Referring to FIG. 2, the ISD 22 may connect with a variety of devices including analog and digital voice telephones 15, 18; digital videophones 130, devices for monitoring home security, meter reading devices (not shown), utilities devices/ energy management facilities (not shown), facsimile devices 16, personal computers 14, cable television terminals (not shown), media player/recorders (not shown) and/or other digital or analog devices. Some or all of these devices may be connected with the ISD 22 via any suitable mechanism such as a single and/or multiple twisted-pair wires and/or a wireless connection. For example, a number of digital devices may be multi-dropped on a single twisted-pair connection. Similarly, analog phones and other analog devices may be multi-dropped using conventional techniques.

The ISD 22 may be located within the home/business or mounted exterior to the home/business. The ISD 22 may operate from electrical power supplied by the local or central office 34 and/or from the customer's power supplied by the customer's power company. Where the ISD 22 includes a modem, it may be desirable to power the ISD 22 with supplemental power from the home in order to provide sufficient power to enable the optimal operation of the modem.

As shown in FIG. 2, in some embodiments the ISD 22 may include a controller 100 which may have any of a variety of elements such as a central processing unit 102, a DRAM 103, an SRAM 104, a ROM 105 and/or an Internet protocol (IP) bridge router 106 connecting the controller 100 to a system bus 111. The system bus 111 may be connected with a variety of network interface devices 110. The network interface devices 110 may be variously configured to include an integrated services digital network (ISD/V) interface 113, an Ethernet interface 119 (e.g., for 28.8 kbps data, 56 kbps data, or ISD/V), an IEEE 1394 "fire wire" interface 112 (e.g., for a digital videodisc device (DVD)), a TVRC modem interface 114 (e.g., for a digital subscriber line (DSL) modem), a residential interface 114, (e.g., standard POTS phone systems such as tip ring), a business interface 116 (e.g., a T1 line and/or PABX interface), a radio frequency (RF) audio/video interface 120 (e.g., a cable television connection), and a cordless phone interface 123 (e.g., a 900 MHZ transceiver). Connected to one of the network interfaces and/or the system bus 111 may be any number of devices such as an audio interface 122 (e.g., for digital audio, digital telephones, digital audio tape (DAT) recorders/players, music for restaurants, MIDI interface, DVD, etc.), a digital phone 121, a videophone/user interface 130, a television set-top device 131 and/or other devices. Where the network interface is utilized, it may be desirable to use, for example, the IEEE 1394 interface 112 and/or the Ethernet interface 119.

A lifeline 126 may be provided for continuous telephone service in the event of a power failure at the CPE 10. The lifeline 126 may be utilized to connect the ISD 22 to the local telecommunications company's central office 34 and, in particular, to the FMP 32 located in the central office 34.

The ISD may be variously configured to provide any number of suitable services. For example, the ISD 22 may offer high fidelity radio channels by allowing the user to select a particular channel and obtaining a digitized radio channel from a remote location and outputting the digital audio, for example, on audio interface 122, video phone 130, and/or digital phones 121. A digital telephone may be connected to the audio interface 122 such that a user may select any one of a number of digital audio service channels by simply having the user push a digital audio service channel button on the telephone and have the speaker phone output particular channels. The telephone may be preprogrammed to provide the digital audio channels at a particular time, such as a wake up call for bedroom mounted telephone, or elsewhere in the house. The user may select any number of services on the video phone and/or other user interface such as a cable set-top device. These services may include any number of suitable services such as weather, headlines in the news, stock quotes, neighborhood community services information, ticket information, restaurant information, service directories (e.g., yellow pages), call conferencing, billing systems, mailing systems, coupons, advertisements, maps, classes, Internet, pay-per-view (PPV), and/or other services using any suitable user interface such as the audio interface 122, the video phone/ user interface 130, digital phones, 121 and/or another suitable device such as a set top device 131.

In further embodiments, the ISD 22 may be configured as an IP proxy server such that each of the devices connected to the server utilizes transmission control protocol/Internet protocol (TCP/IP) protocol. This configuration allows any device associated with the ISD to access the Internet via an IP connection through the FMP 32. Where the ISD 22 is configured as an IP proxy server, it may accommodate additional devices that do not support the TCP/IP protocol. In this embodiment, the ISD 22 may have a proprietary or conventional interface connecting the ISD 22 to any associated device such as to the set top box 131, the personal computer 14, the videophone 130, the digital telephone 18, and/or some other end user device.

In still further embodiments, the ISD 22 may be compatible with multicast broadcast services where multicast information is broadcast by a central location and/or other server on one of the networks connected to the FMP 32, e.g., an ATM-switched network. The ISD 22 may download the multicast information via the FMP 32 to any of the devices connected to the ISD 22. The ISD 22 and/or CPE 10 devices may selectively filter the information in accordance with a specific customer user's preferences. For example, one user may select all country music broadcasts on a particular day while another user may select financial information. The ISD 22 and/or any of the CPE 10 devices may also be programmed to store information representing users' preferences and/or the received uni-cast or multicast information in memory or other storage media for later replay. Thus, for example, video clips or movies may be multicast to all customers in the community with certain users being preconfigured to select the desired video clip/movie in real time for immediate viewing and/or into storage for later viewing.

Figure 3A:
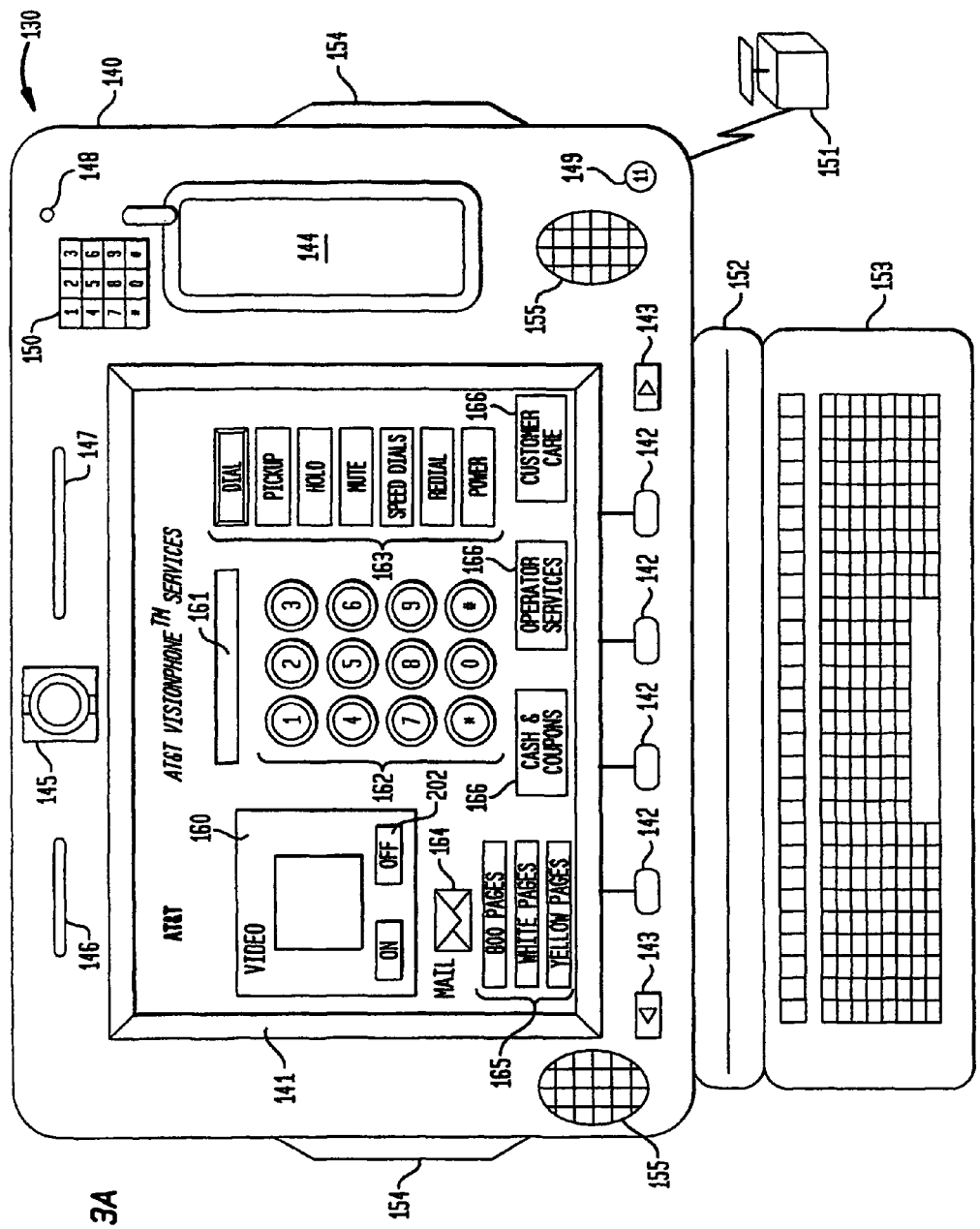
FIGS. 3A and 3B illustrate an embodiment of a video phone consistent with the architecture shown in FIG. 1.
Figure 3B:
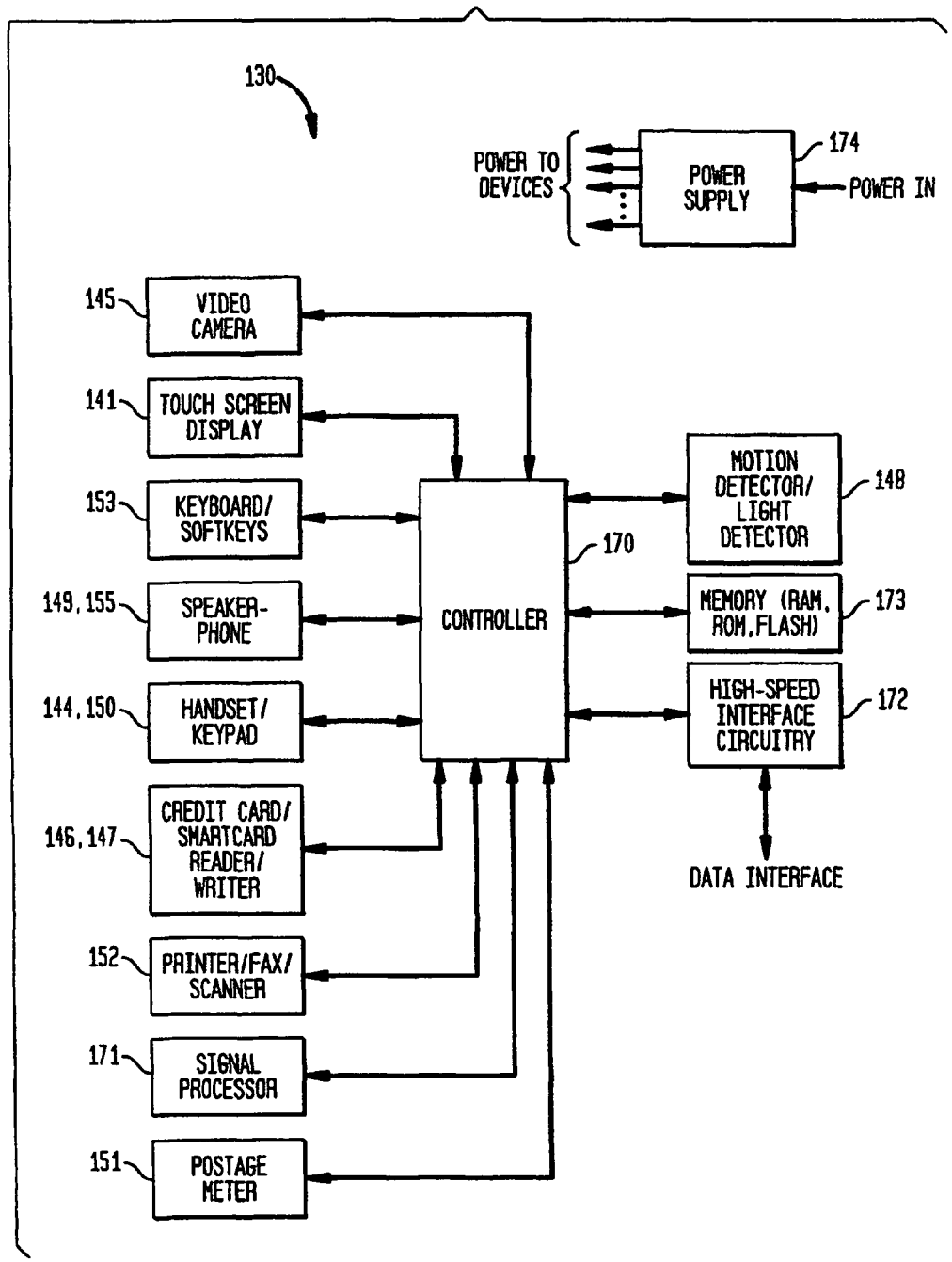

Referring to FIG. 3A, a videophone 130 may include a touch screen display 141 and soft keys 142 around the perimeter of the display 141. The display may be responsive to touch, pressure, and/or light input. Some or all of the soft keys 142 may be programmable and may vary in function depending upon, for example, the applet being run by the videophone 130. The function of each soft key may be displayed next to the key on the display 141. The functions of the soft keys 142 may also be manually changed by the user by pressing scroll buttons 143. The videophone 140 may also include a handset 144 (which may be connected via a cord or wireless connection to the rest of the videophone and/or directly to the ISD), a keypad 150, a video camera 145, a credit card reader 146, a smart card slot 147, a microphone 149, a motion and/or light detector 148, built-in speaker(s) 155, a printer/scanner/facsimile 152, and/or external speakers 154 (e.g., stereo speakers). A keyboard 153 and/or a postage scale 151 may also be connected to the videophone 130. Any or all of the above-mentioned items may be integrated with the videophone unit itself or may be physically separate from the videophone unit. A block diagram of the video phone unit is shown in FIG. 3B. Referring to FIG. 3B, in addition to the items above, the video phone 130 may also include a signal processor 171, high speed interface circuitry 172, memory 173, power supply 174, all interconnected via a controller 170. Other input/output devices connected to the controller 170 may include a video camera 145, a key board employing soft keys 153, a speakerphone 149, 153, a handset/key pad 144, 150, a credit card/smart card reader/writer 146, 147, a printer/fax/scanner 152 and a postal meter 151.

When the videophone 130 is used as a videophone, the display 141 may include one or more video window(s) 160 for viewing a person to, whom a user is speaking and/or showing the picture seen by the person on the other end of the video phone. The display may also include a dialed-telephone-number window 161 for displaying the phone number dialed, a virtual keypad 162, virtual buttons 163 for performing various telephone functions, service directory icons 165, a mail icon 164, and/or various other service icons 166 which may be used, for example, for obtaining coupons or connecting with an operator. Any or all of these items may be displayed as virtual buttons and/or graphic icons and may be arranged in any combination. Additionally, any number of other display features may be shown on the video phone in accordance with one or more of the applications incorporated by reference below.

Referring to FIG. 4A, the FMP 32 may coordinate the flow of data packets, separate voice signals from other signals, perform line monitoring and switching functions, and/or convert between analog and digital signals. The FMP 32 may process data sent from the CPE 10 to the central or local office 34 by separating and reconstructing analog voice signals, data, and control frames. The FMP 32 may process data sent from the central or local office 34 to the CPE 10 by separating control messages from user information, and configure this information into segments that for transport across the digital subscriber loop. The FMP 32 may also terminate the link layer associated with the digital subscriber loop.

In some embodiments, the FMP 32 may include an access module 70 and a digital loop carrier 87. The access module 70 may include a line protector 71, a cross-connector 73, a plurality of TVRC modems 80, a plurality of digital filters 82, a controller multiplexer 84, and/or a router and facilities interface 86. The digital loop carrier 87 may include a plurality of line cards 96, a time domain multiplexing (TDM) multiplexer (MUX) 88, a TDM bus 90, a controller 92, and/or a facilities interface 94.

During normal operations, digital signals on the customer connection 30 (e.g., twisted-pair lines) containing both voice and data may be received by the TVRC modems 80 via the line protector 71 and the cross-connector 73. Preferably, the line protector 71 includes lightning blocks for grounding power surges due to lightning or other stray voltage surges. The TVRC modems 80 may send the digital voice and/or data signals to the controller multiplexer 84 and the digital filters 82. The digital filters 82 may separate the voice signals from the digital data signals, and the controller multiplexer 84 may then multiplex the voice signals and/or data signals received from the digital filters 82. The controller multiplexer 84 may then send multiplexed voice signals to the TDM MUX 88 and the data signals to the router and facilities interface 86 for transmission to one or more external networks. The TDM MUX 88 may multiplex the voice signals from the controller multiplexer 84 and/or send the voice signals to the TDM bus 90, which may then send the digital voice signals to the controller 92 and then to the facilities interface 94 for transmission to one or more external networks. Both the router and facilities interface 86 and the facilities interface 94 may convert between electrical signals and optical signals when a fiber optic link is utilized.

When there is a failure of the digital data link (e.g., if there is a failure of the TVRC modems 80 at the FMP 32 or the TVRC modem 114 at the ISD 22), only analog voice signals might be sent over the subscriber lines 30. In such a case, the analog voice signals may be directly routed to the line cards 96, bypassing the TVRC modems 80, the digital filters 82, the controller multiplexer 84, and the TDM MUX 88. Thus, voice communication is ensured despite a failure of the digital data link. The line cards 96 may convert the analog voice signals into digital format (e.g., TDM format) and send the digitized voice data onto the TDM bus 90 and eventually through the controller 92 and the facilities interface 94 for transmission to one or more external networks.

Figure 4B:
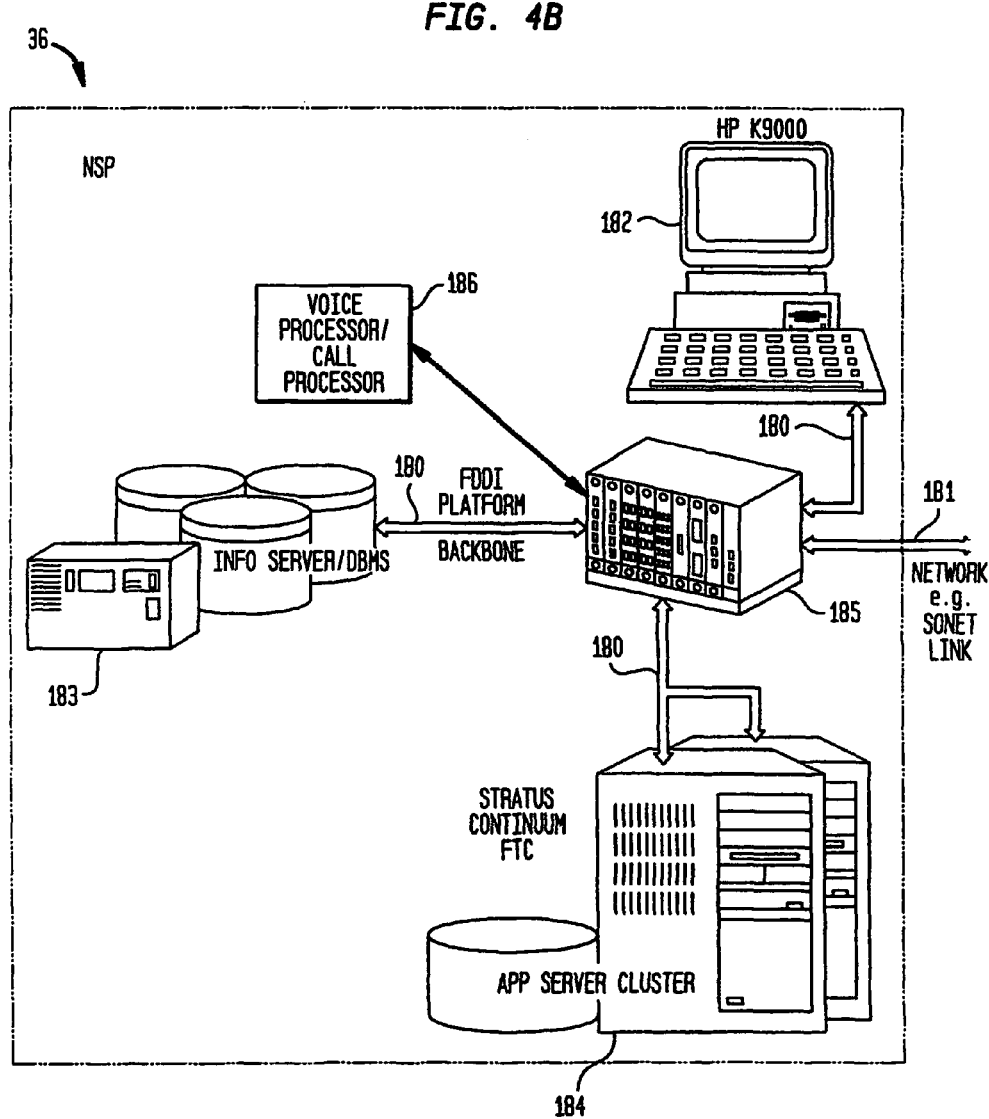
FIG. 4B illustrates a block diagram of an embodiment of a network server platform consistent with the architecture shown in FIG. 1.

Referring to FIG. 4B, the NSP 36 may be variously configured to provide any number of services provided by a server such as information services, Internet services, pay-per-view movie services, data-base services, commercial services, and/or other suitable services. In the embodiment shown in FIG. 4B, the NSP 36 includes a router 185 having a backbone 180 (e.g., a fiber distributed data interface (FDDI) backbone) that interconnects a management server 182, an information/database server 183, and/or one or more application server clusters 184. The NSP 36 may be connected via the router 185 by a link 181 to one or more external networks, NSPs 36, and/or an FMPs 32. The information/data base server 183 may perform storage and/or database functions. The application server cluster 184 may maintain and control the downloading of applets to the ISD 22. The NSP 36 may also include a voice/call processor 186 configured to handle call and data routing functions, set-up functions, distributed operating system functions, voice recognition functions for spoken commands input from any of the ISD connected devices as well as other functions.

For high end residential consumers who want more convenience and simplicity in their daily lives and access to the information highway, the videophone is an information and telephony access service that provides a voice and touch screen customer interface to an local exchange carrier (LEC) enabling easy delivery of a wide range of telephony services with cost savings due to automated operator services, customer care, and marketing. New, enhanced services include opportunities such as interactive electronic catalog shopping from the home, advertising, and the ability to offer instant (always on), high speed Internet access to every household, penetrating those markets that currently lack in home personal computers. Additional services include, high fidelity voice and touch screen customer interface for users to a access the network server. This is accomplished via asymmetric high speed data transport. With the higher data transfer rates, $3^{rd}$ party bill payment, banking, smart card ATM transactions, electronic delivery of consumer product coupons, interactive video teleconferencing, state-of-the-art networking for work-at-home environments, private line services electronic shopping from the home, electronic coupons, advertising, and to high speed Internet access.

Implementation of this new architecture allows for differentiation of local service, will provide new revenue streams from value-added services, and have the potential to significantly reduce operational costs. The architecture is constructed such that additional performance benefits from the existing loop plant are extracted and maximizes use of the existing infrastructure and current systems.

The new architecture implements active services where the user triggers a stimulus by touch, voice or a combination of touch and voice commands to obtain a network based response to expand traditional services as well as provide entirely new services. These responses and the associated services include call connection, information delivery, trigger network response, and performance transactions.

Call connection services provide for calls to be initiated by touching icons corresponding to the called party. It also enables self scheduling of conference calls without the need for an operator as well as initiation of interactive calls with white board augmentation. Class services can likewise be invoked via icons and prompts in a natural manner without requiring memorization of numerical codes.

Information delivery services provide for a simple user interface that enables data base and search engine technology (formerly accessible only to networked computers) to be leveraged for telephony services. For example, access to regional, national or international electronic interaction with yellow and white page directories, navigation and access for voice, e-mail, and fax messages, review of AT&T, bill for services, review of AT&T calling plans, review of CLASS and other service offerings. Thus certain marketing, operator services, billing, and customer care functions can be accessed by the customer without the need for an intermediate service representative—reducing operations cost while increasing customer convenience. The video phone eliminates the need for an intermediary to call up information on a screen and read it to the customer and streamlines customer access to information.

In response to a trigger, the network provides a screen interface that enables the customer to obtain operator services without accessing a human operator, obtain credit for wrong numbers automatically, view rate tables, self provision an AT&T Calling Plan or other CLASS services, conduct conference calls, or define a user profile for pointcast on a "ticker tape" that scrolls desired information on the videophone screen. Other trigger services could include a wake up service that automatically calls the user at a preselected time.

Performance transactions allows users via the videophone and its associated card swiper to enable users to perform transactions with security protection. These transactions include paying regular bills with paperless transactions, perform electronic banking including obtaining smart card cash in the home without the need to visit a bank or an ATM machine, conduct E-commerce, purchase products advertised on television via a synchronized ordering screen. The electronic bill payment scheme not only benefits the user but allows the service provider to obtain additional revenue by allowing those companies to out source bill payments to AT&T.

Passive services can also be offered so that active customer responses are not required. These include advertising, providing electronic coupons, personalized news delivery services, and access to community news such as school closings. Providing an advertising feed directly to the customer premises equipment provides a new and potentially very large business opportunity to the local access network provider. Advertising can be displayed on the video phone, whenever the videophone is not in active use. User profiles maintained on the network would enable the advertisements to target customer interests, geographic location, demographics, or some other criteria.

Providing electronic coupons is another passive service opportunity. The electronic coupon can be displayed on the touch screen at appropriate times throughout the day (e.g., orange juice in the early morning) as "screen savers." By swiping their smart card customers can electronically collect such coupons and use them at the store without the inconvenience of cutting them out of newspapers, etc. At the same time AT&T participates in the coupon industry and has access to another revenue stream.

Delivery of personalized news leverages diverse content assists in the creation of user profiles. In addition, emergency broadcasts relating to flash flood warnings, tornado, and hurricanes, can be broadcast to users in the affected areas without affecting the user's other transactions that are occurring simultaneously. These emergency signals could also be sent with alarms for waking up and alerting users to potential natural disasters.

The offering of interactive services include the combination of a graphics capable touch screen videophone, simultaneous voice and data capability, and a high speed data line to furnish a superior user interface than a traditional voice telephone and so enables a rich collection of new interactive services. These include multimedia enhanced voice calls, virtual PBX services, point and click conferencing, intelligent call management, access to the Internet, and a universal multimedia mailbox.

The multimedia enhances voice calls allows users to supplement voice calls with whiteboard graphics or text. The multimedia format can provide improved customer care, enhanced catalog ordering, and interactive voice and data response applications. In addition, information-on-demand and support for work-at-home access is also provided.

The virtual PBX services include screen pops for message/call alerting, and graphical call management using touch interface with call setup/bridging capabilities. Point-and-click conferencing provides a graphical user interface to initiate POTS calls. The intelligent call management system provides easy instructions to direct call management maintaining a personal registry, mobility manager, call scheduling and "call me back" services, and a personal assistant.

Access to the Internet without a personal computer or modem via Internet Service Provider (e.g., WorldNet) can be provided allowing users without access to a personal computer to have access to e-mail, the World Wide Web, a universal multimedia mailbox with voice, text, audio, and images integrated with a common interface capabilities.

The flexibility of the new architecture allows for implementation of services in phases to minimize impact on the local infrastructure and to allow the service provider to handle and support problems with implementation of services. As installation procedures become routine, additional services can be phased in based on customer demand. Early phases can be target marketed to specific demographics or to regional implementation.

For example, the initial implementation can be tailored to customers who already have two or more twisted pair connects with the local office. The videophone can contain Win32 application programmable interfaces (APIs) supporting TCP/IP, POP3, RAS, and TAPI protocols with a built in browser. One of the twisted pair will access the AT&T server via a modem (28.8 or possibly 56 kbps). The second twisted pair is used for switched telephony and managed via a graphical user interface. An AT&T server at a WorldNet services center could provide access to white and yellow page directory information, calling plan descriptions, and rate tables. Other interfaces could provide access to the WorldNet Internet services such as the World Wide Web, e-mail, advertising, and E-commerce platforms A requirement of the touch screen services is availability of a data link to the server. In later phases of implementation, a DSL link to the home is provided with an access protocol that supports simultaneous voice and data services. In the initial phase, the simultaneous voice and data capability is approximated by having the data line automatically call the WorldNet POP when a built-in motion detector is triggered by someone nearby. During these periods of local presence, the AT&T server will put up advertising and personal information on the screen and be available to support touch activated services (e.g., calling, CLASS services), and directory information delivery. All of the line signaling for voice calls to the LEC switch (e.g., DTMF, flash hooks, etc.) for class services and dialing can be generated by the video phone processing engine in response to touch screen commands with support from the second twisted pair for client/server connection as needed.

Later phases of implementation can include the introduction of advanced xDSL access to the customer equipment premises expanding the range of videophone services. These xDSL services will support 7 kHz high fidelity voice and a touch screen customer interface to the network server. This will provide easier delivery of a wider range of telephony services with cost savings due to automated operator services, customer care, billing, provisioning, and marketing. The enhanced services such as $3^{rd}$ party bill payment, banking, smart card ATM transactions, electronic shopping from the home, electronic coupons, and advertising can be implemented with the xDSL connection. In addition, high speed Internet access is possible as well as extending Internet capabilities to users who lack personal computers. Voice calls can be made with a packet-to circuit translator (PCT) for interfacing voice telephony with the local office using the TR-303 signaling simulating modified digital subscriber loop access to the local office.

Figure 5:
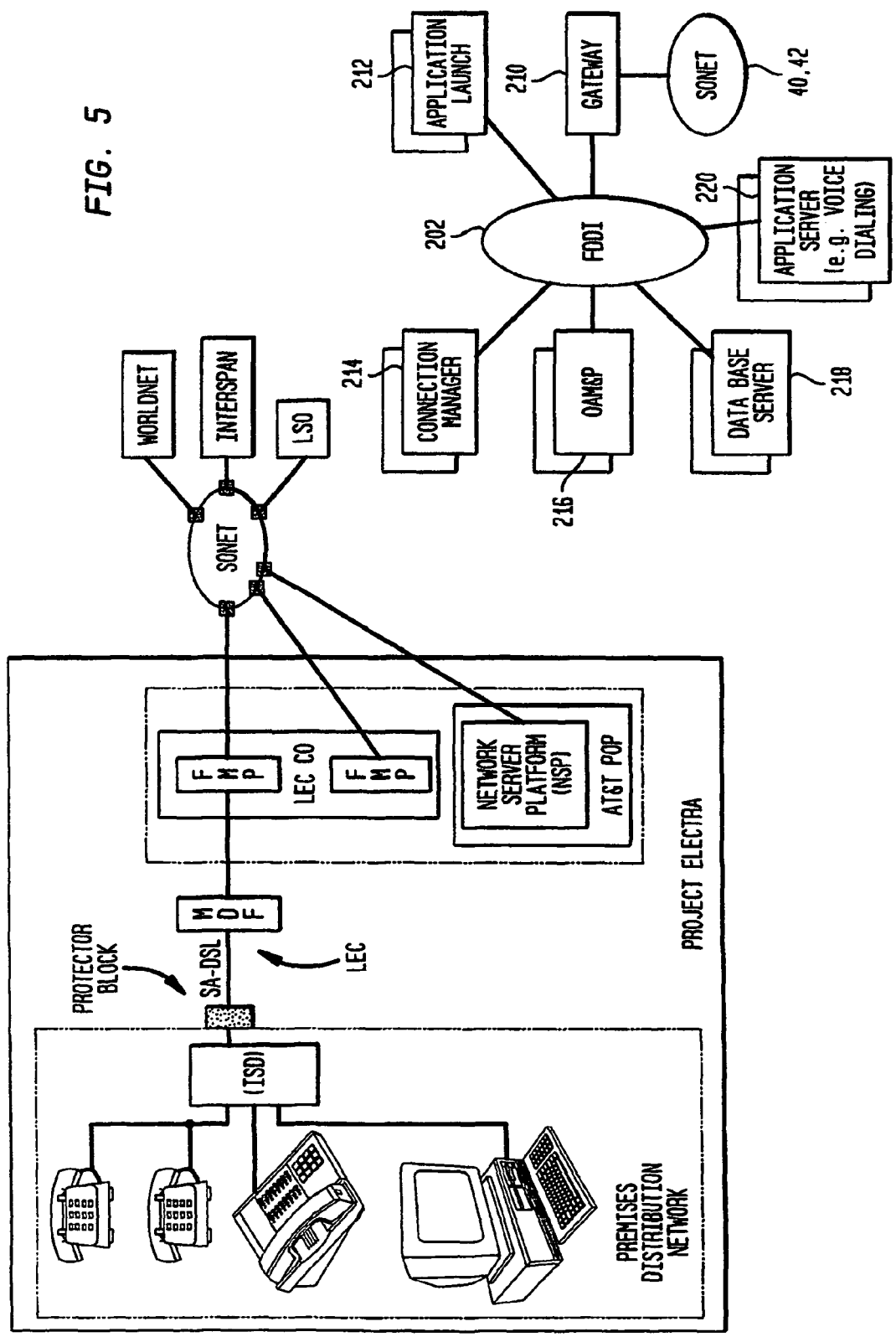
FIG. 5 illustrates a block diagram of the FDDI interface located within the NSP.
Figure 6:
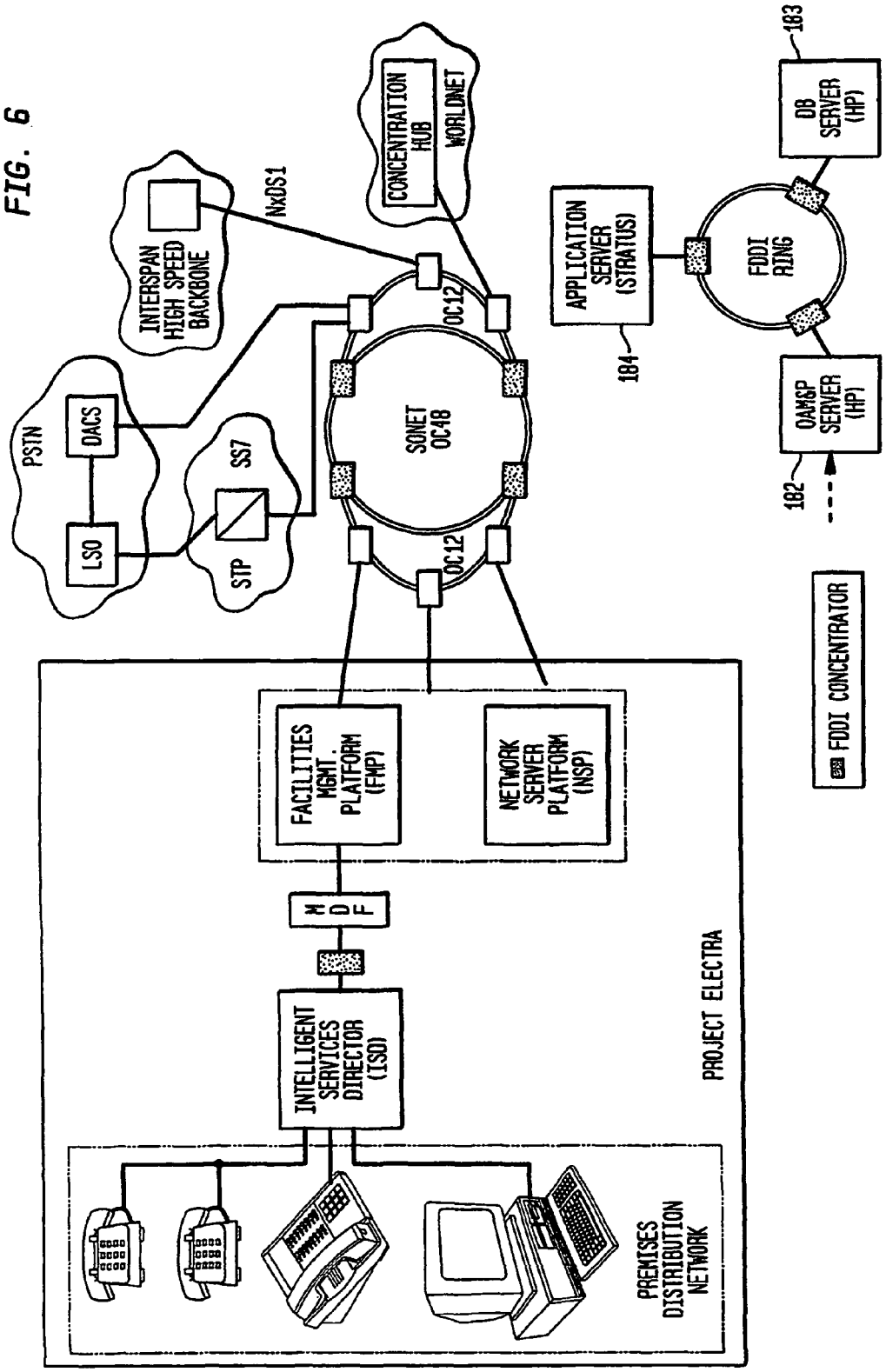
FIG. 6 illustrates a block diagram of the FDDI interface located within the NSP.

FIG. 5 illustrates a block diagram of the NSP 36 consisting of devices and services used in the implementation of the new architecture. Connected to the SONET trunks 40 and 42 is a gateway 210. The gateway 210 might also function as the router 185 that was previously discussed. Located around a FDDI ring 202 are the management server 182, the information database server 183, and one or more application server clusters 184, as illustrated in FIG. 6.

The connection manager 214 initiates and terminates the placement of telephone calls, while managing the services and messaging. In a typical scenario, the connection manager 214 automates the calling process. This automation involves the executing of computer commands to search records in the database server 218 to ensure that the customer is a subscriber to the desired service or that the called number is a subscriber to the desired service. In addition, the connection manager 214 uses the operations, administration, maintenance, and provisioning 216 to track billing information. After the connection manager 214 obtains the required authorization, it launches the application 212 from the application server 220.

The OAM&P server 182 contains OAM&P management information 216 consisting of data relating to configuration, capacity, fault, order, traffic activity, design, security, surveillance and testing of the network. The information/database sever 183 contains specific customer information such as user profiles, authorization levels of service, provisioning and electronic commerce. The application server clusters 184 manage and track information regarding computer boot operations and initializations, call management, fault recognition and recovery (FR&R), application binding, maintenance and design, application invoicing, craft interface enhancement, application downloads, translations (Xltn), recent change and verify (RC/V), authorizations and registrations, configurations and performance statistics (Pertf Stat).

Figure 7:
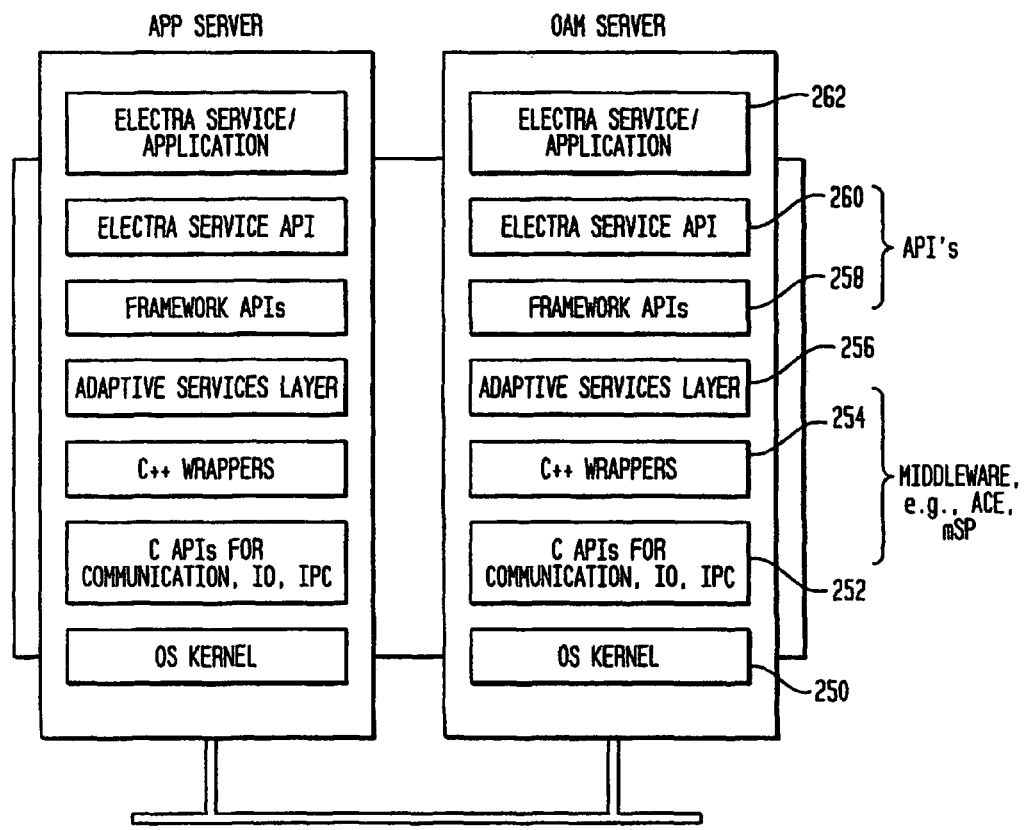
FIG. 7 illustrates the protocol hierarchy of the software layer architecture.

FIG. 7 illustrates the software layer architecture for the application server 184 and the operation, administration and maintenance (OAM) server 182. In both the application server 184 and the OAM server 182, the software layer architecture is the same. In data link layer, the operating system kernel 250 contains a C application programmable interface 252 for interfacing with communication, input/output and interprocess communication protocol IPC. The data link, network, and transport layer contain middleware including the C applications 252, C++ wrappers 254 and the adaptive services layer 256. The C++ wrappers optimize the C library functions and the middleware puts intelligence into form object oriented programs in the transport layer to help applications route upwards and downwards in the protocol hierarchy. The session and transport layers contain service applications 260 and framework applications 258, respectively. The application layer contains the service/applications 262.

Figure 8:
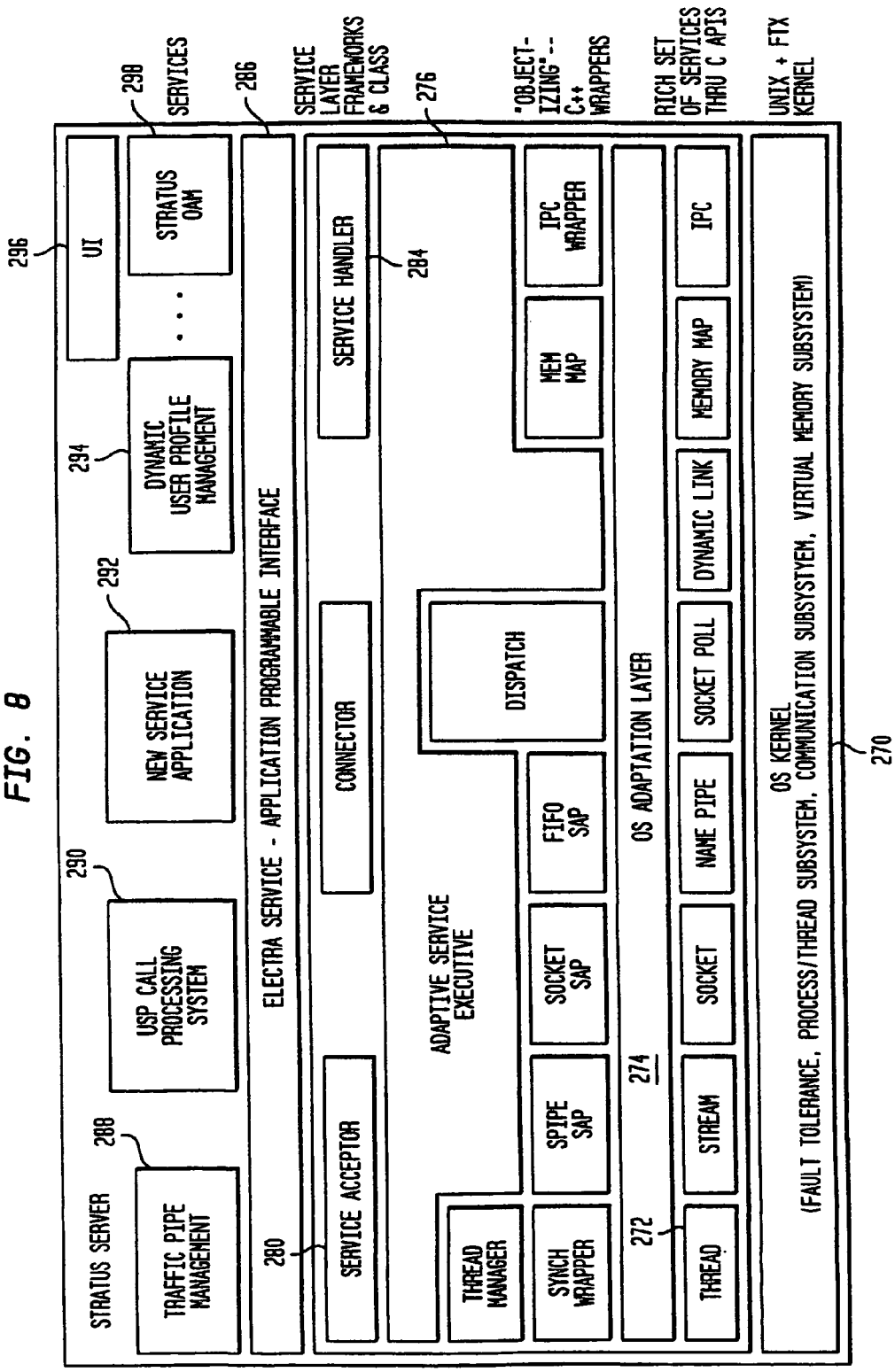
FIG. 8 illustrates the protocol hierarchy of the application server platform software architecture.

FIG. 8 illustrates protocol hierarchy for the application server platform software architecture. The physical layer includes the operating system kernels 270 for fault tolerance, process/thread subsystems, communication subsystems, and virtual memory subsystems. The data link layer contains the following C application programmable interface sets 272: thread, stream, socket, name pipe, socket poll, dynamic link, memory map, and IPC. The network layer contains the operating system adaption layer 274, the thread manager, synch wrapper, spipe SAP, socket SAP, FIFO SAP, MEM MAP, and IPC wrapper. The transport layer contains the adaptive service executive 276 and the dispatch 278. The session layer contains the service acceptor 280, connector 282 and service handler 284. The presentation layer contains application program interface 286 and the application layer contains the traffic pipe management 288, the universal signal processing call processing system 290, new service applications 292, dynamic user profile management 294, user interfaces 296, and the OAM&P services 298. These protocols use a fault tolerant Unix language to make the transition between interfaces transparent.

Figure 9:
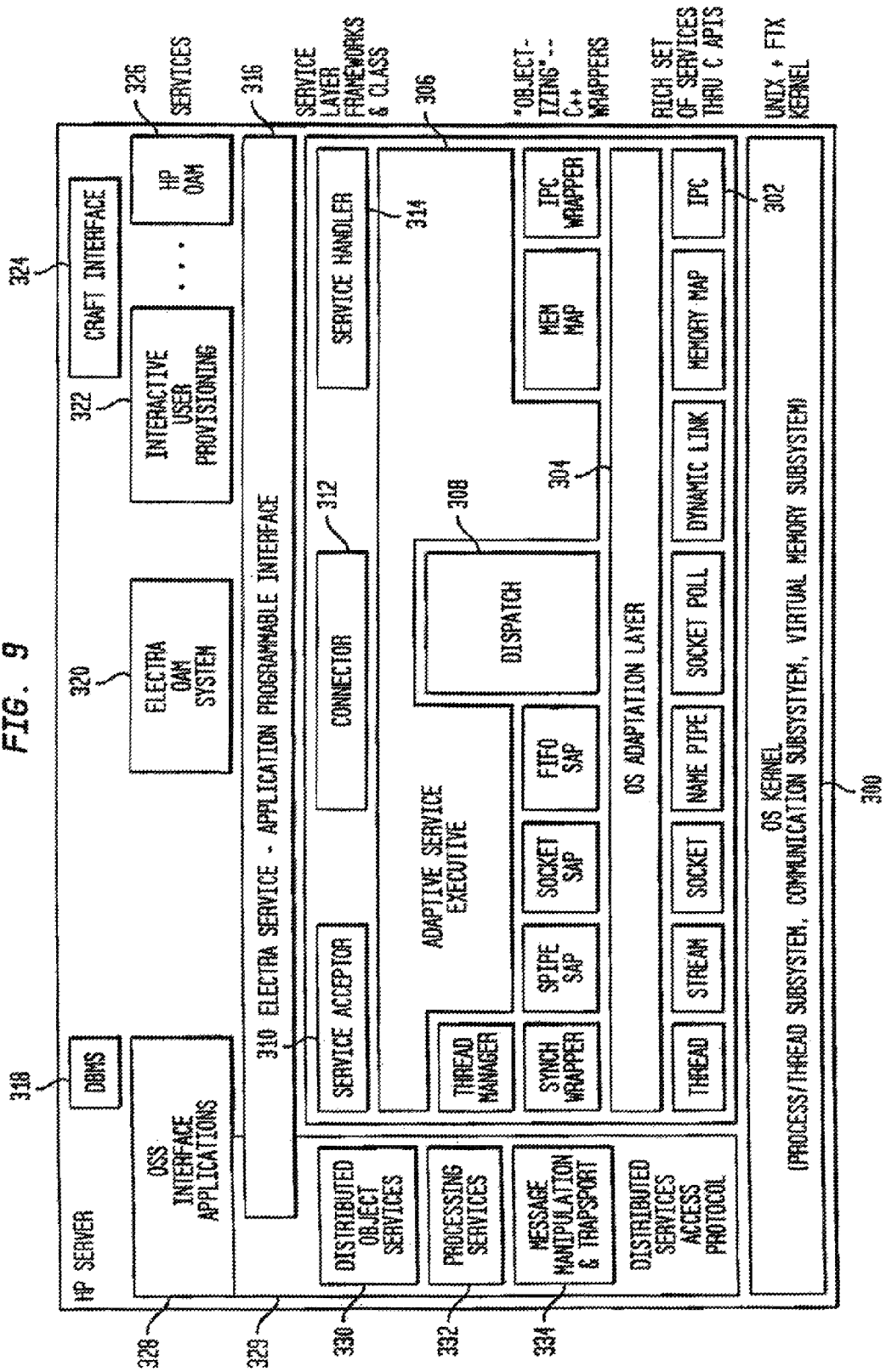
FIG. 9 illustrates the protocol hierarchy of the OAM&P server platform software architecture.

FIG. 9 illustrates the protocol hierarchy for the OAM&P server platform software architecture. The physical layer includes the operating system kernels 300 for fault tolerance, process/thread subsystems, communication subsystems, and virtual memory subsystems. The data link layer contains the following C or other application programmable interface sets 302: thread, stream, socket, name pipe, socket poll, dynamic link, memory map, and IPC. The network layer contains the operating system adaption layer 304, the thread manager, synch wrapper, spipe SAP, socket SAP, FIFO SAP, MEM MAP, and IPC wrapper. The transport layer contains the adaptive service executive 306, and the dispatch 308. The session layer contains the service acceptor 310, connector 312 and service handler 314. The presentation layer contains application program interface 316. The application layer contains the database management system (DBMS) 318, the OAM&P system services 320, the interactive user provisioning 322, craft interface 324 and the HP OAM 326.

The OSS interface applications 328 are supported by the distributed services access protocol 329. The distributed services access protocol 329 is supported by the session layer distributed object services 330, the transport layer process services 332 and the network layer message manipulation and transport 334. These protocols also use a fault tolerant Unix language to make the transition between interfaces transparent.

Figure 10:
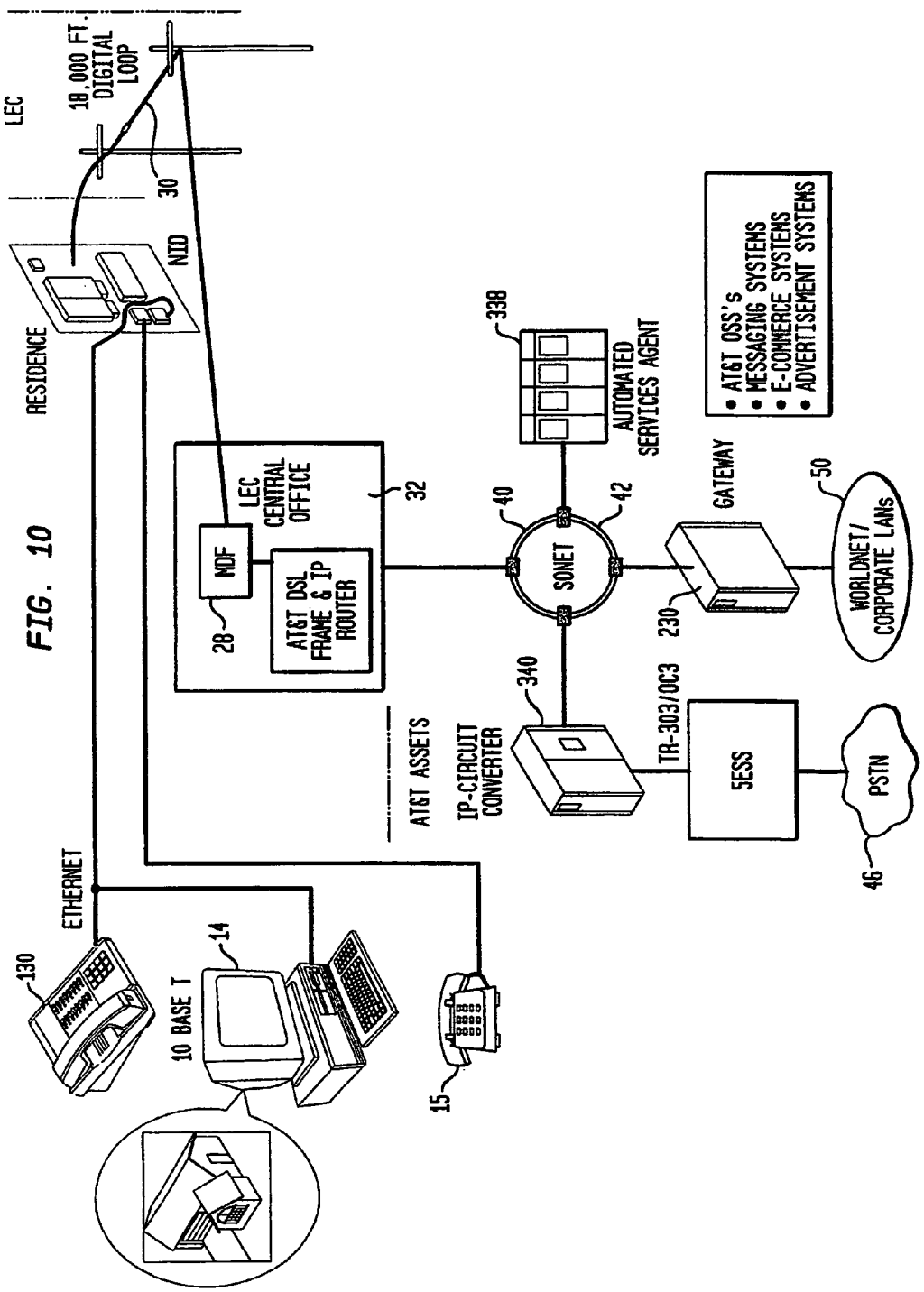
FIG. 10 illustrates the overall architecture and layout of the equipment to implement the new services.

In addition to the devices disclosed in FIG. 1, FIG. 10 illustrates overall service concepts. Key aspects of the technologies employed in this architecture is the use of self-adaptive DSLs 30. The self-adaptive DSL supports sophisticated digital signal processing including high fidelity packet voice transmission and robust automatic route selection (ARS). ARS directs outgoing, business group line calls to the customer's most preferred available route allowing the customer to preselect a sequence of up to four private routes for each code point in the PSTN 46 for which a charge applies.

Included in FIG. 10 is the automated services agent 338 and an IP circuit converter 340. The automated services agent 338 supports the interexchange carrier's OSS, messaging systems, electronic commerce, and advertising systems. The IP circuit converter 340 converts IP packets into traffic suitable for transmission via circuit-switched network elements.

The services offered to consumers with this architecture include high speed Internet access, 7 kHz telephone voice quality service, graphical user interfaces for ease in accessing automated services, provisioning and billing. Capabilities for 7 kHz bandwidth voice calls allows for 64 kbps transmission rates with a bit error rate less than $10^{-6}$ and a delay of less than 150 millisecond. For telecommuters, in addition to the consumer services, the architecture supports high speed corporate local area network (LAN) Intranet access. For business customers, the architecture supports secure electronic commerce and personalized delivery of advertising to consumers with the capacity to tailor the advertising campaign to the consumer's profile.

The architecture supports the following connectivity services: high speed Internet access, CD quality voice transmission, asymmetrical and symmetrical high speed data transmission rates, two-way 384 kbps video transmission, video conferencing, wireless voice mobility within the home and possibly within the neighborhood, conversion of cellular traffic to traditional land line service within range of the ISD, wireless data mobility within close proximity to the ISD. The architecture support the following information call management services: custom local area signaling services (CLASS), call alerting and redirection, electronic commerce via access to the Internet and the use of smart cards or credit cards, multiple voice connections, telephony management, secure personalized Intranet (voice and data), access to community online information services, personalized and multiple personalized Intranet, access to interactive multimedia, and movies on demand.

Online management is also possible implementing user activated service provisioning, electronic initiated service inquiries, electronic billing and bill payment schemes, voice activated command execution, "follow-me" service profiles, and virtual home location profiles. User interface capability includes unique digital signatures, touch screen and dialing pad access to services, integrated personal computer access, smart card reading and recharging capabilities, voice dialing, compatibility with cellular phones (for example, IS54, IS95, GSM or other cellular phones), compatibility with personal digital assistants, network computers and personal computers via RF modems.

Figure 11:
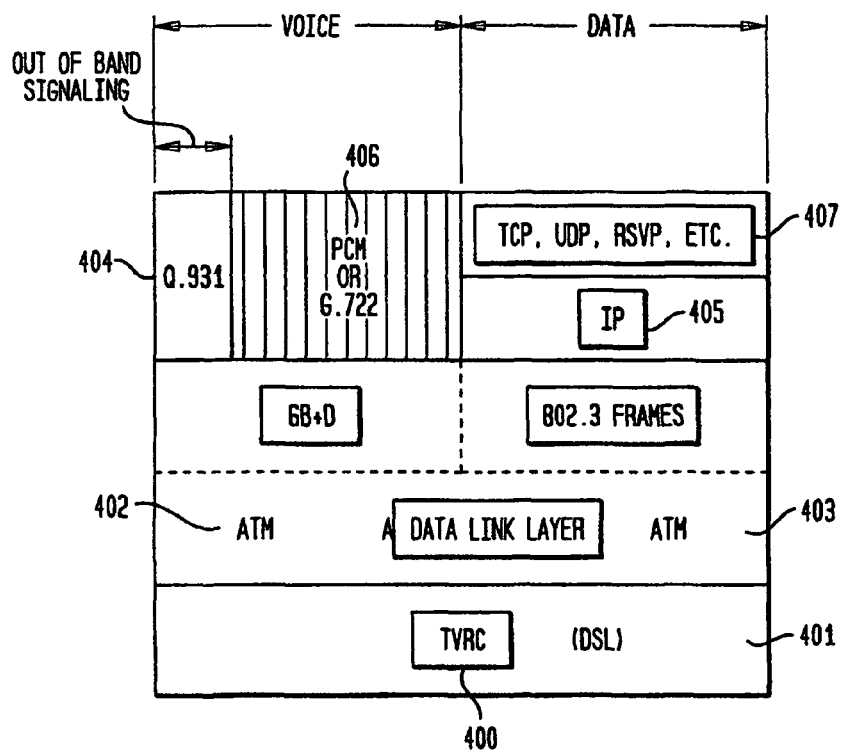
FIG. 11 illustrates the protocol hierarchy between the ISD and the FMP.

FIG. 11 illustrates the protocol hierarchy between the ISD and the FMP. For voice calling services, the TVRC protocol 400 provides the physical layer. The data link layer 402 attaches a 6 bit header to the data packet and the network layer 404 is supported by Q.931, pulse code modulation (PCM), or G.722. The standard Q.931 supports out-of-band signaling. For data transmission, the TVRC protocol provides the host-to-network layer 401. The Internet layer 403 is supported by IEEE 802.3 standard. The Internet layer 405 also supports the Internet Protocol (IP). The Internet layer 403 and 405 define an official packet format and deliver IP packet to their intended destination. The transport layer 407 is supported by the transmission control protocol (TCP), user datagram protocol (UDP) and resource reservation protocol (RSVP).

Figure 12:
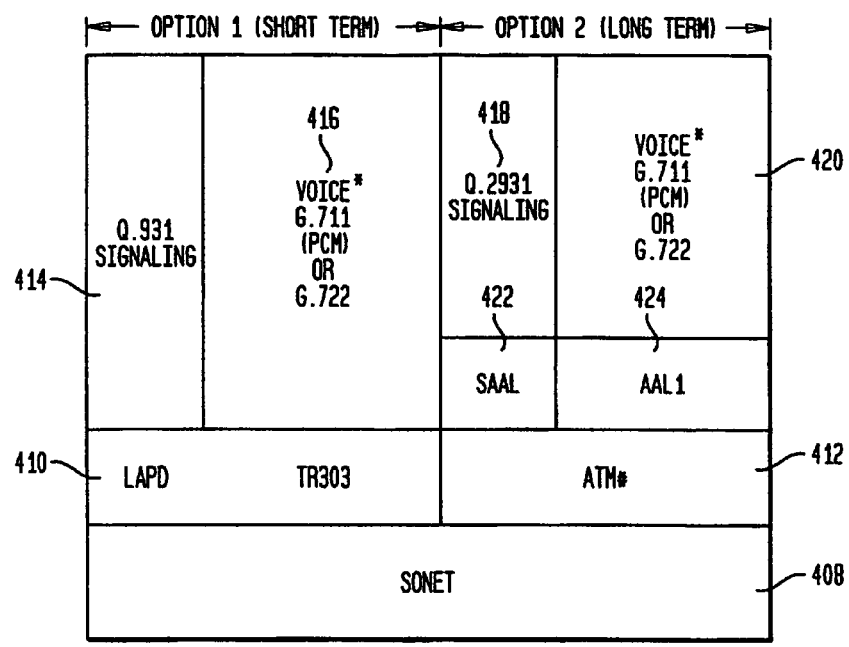
FIG. 12 illustrates the protocol hierarchy between the FMP and the network.

FIG. 12 illustrates the protocol hierarchy between the FMP and the network. The SONET protocol 408 is used in the physical layer for both short term (option 1) and (long term option 2). In the short term, the data link layer is supported by TR303 [410]. Eventually, the ATM 412 protocol will replace TR 303 [410] in the data link layer. In the short term, the network layer is supported by Q.931 [414] for the transmission of signaling information and G.711 (PCM) or G.722 [416] will support the transmission of voice signals. In the long term, Q.2931 [418] will support signaling information and G.711 (PCM) or G.722 [420] will support the transmission of voice signals. In the long term, SAAL 422 and ATM adaption layer 1 (AAL1) 424 supports the signaling and voice traffic, respectively. The AAL is fully independent of the physical layer, and converts higher-layer information, such as data packets, into ATM cells for transmission across the ATM network. At the receiving end, the AAL converts the cells back into the higher-layer information.

Figure 13:
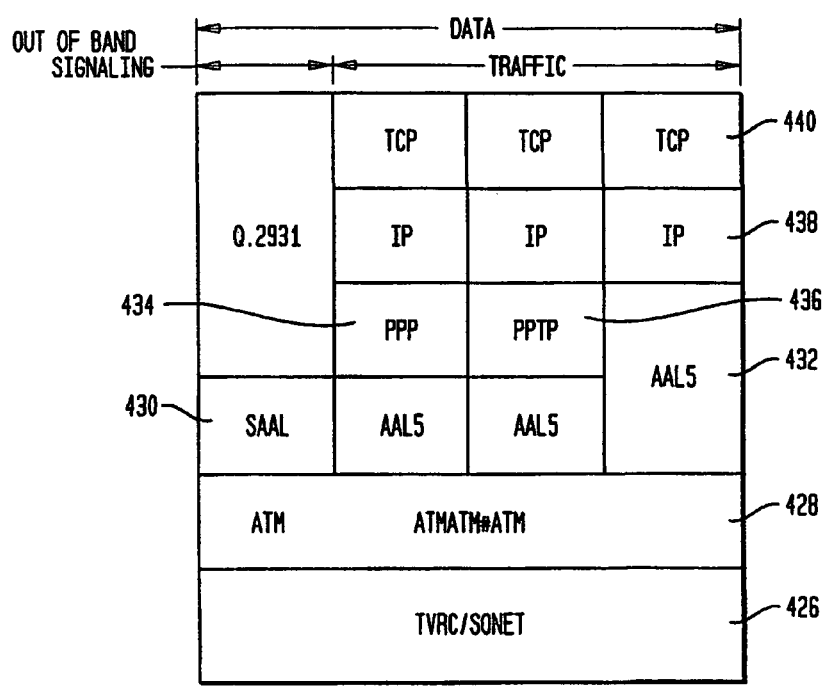
FIG. 13 illustrates the data protocol hierarchy between the FMP and the network.

FIG. 13 illustrates one possible data protocol hierarchy between the FMP and the network. At the host-to-network layer, TVRC, SONET protocols 426 or ATM protocols 428 will be used for the transmission of data from the FMP 32 to the network. In the Internet layer, out-of-band signaling is performed by SAAL 430 and traffic is supported by AAL5 [432]. Also in the Internet layer, point-to-point 434 and point-to-point tunneling protocol 436 is used to transport traffic as well as IP 438. In the transport layer, traffic is supported by TCP 440.

Figure 14:
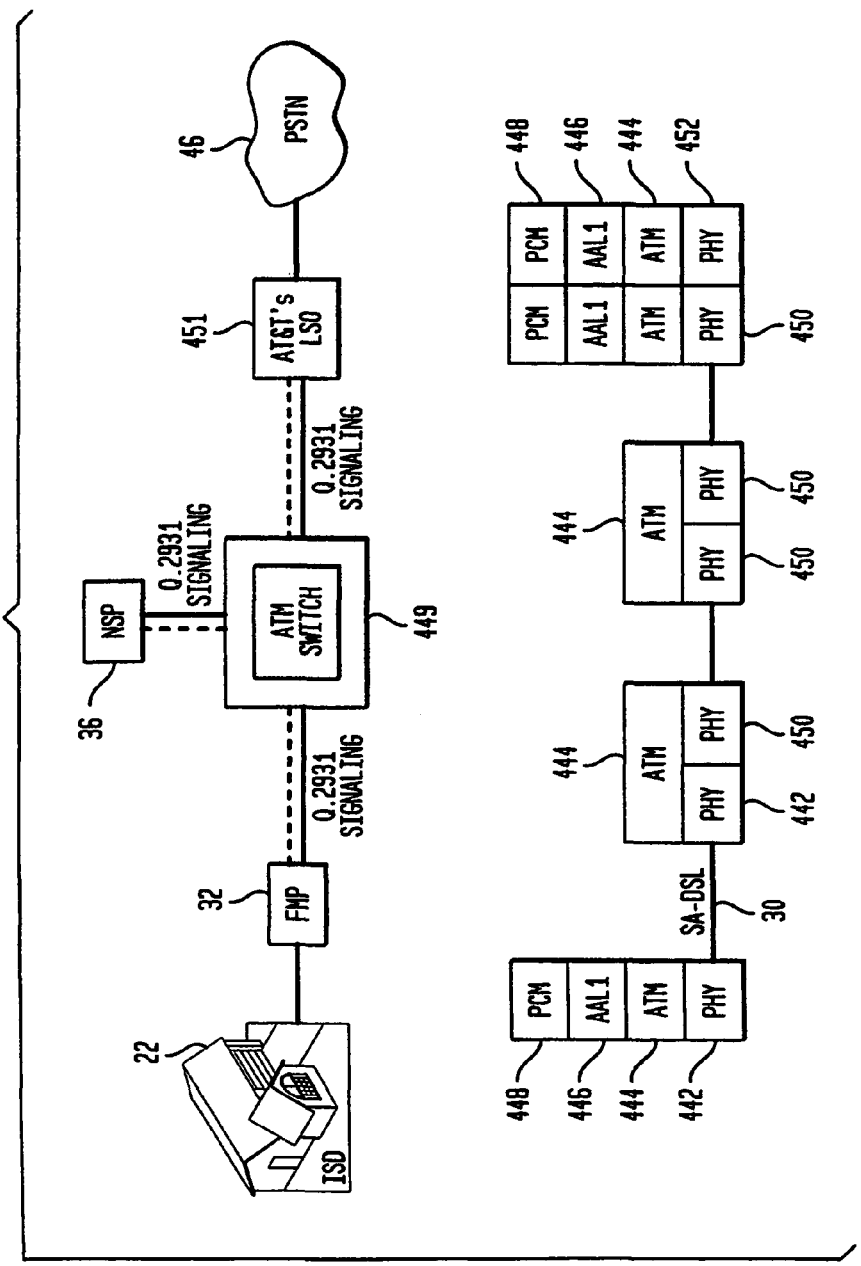
FIG. 14 illustrates the protocol hierarchy for voice services (option 1) employing end-to-end ATM.

FIG. 14 illustrates the protocol hierarchy for voice services (option 1) employing end-to-end ATM. from the ISD 22 to the PSTN 46. The ISD 22 is connected to the FMP 32 by a self adaptive DSL 30 in the physical layer. The ISD 22, the FMP 32, ATM switch 449 and the local service office (LSO) 451 have their data link layer supported by ATM 444. The ISD 22 and the LSO 451 have their network layer by AAL1 [446] and their transport layer supported by PCM 448. At the FMP 32, the data link layer is supported by ATM 444. Links from the ATM switch 449 to the FMP 32, the NSP 36 and the LSO 451, have the signaling aspects of these connections supported in the physical layer by Q.2931.

Figure 15:
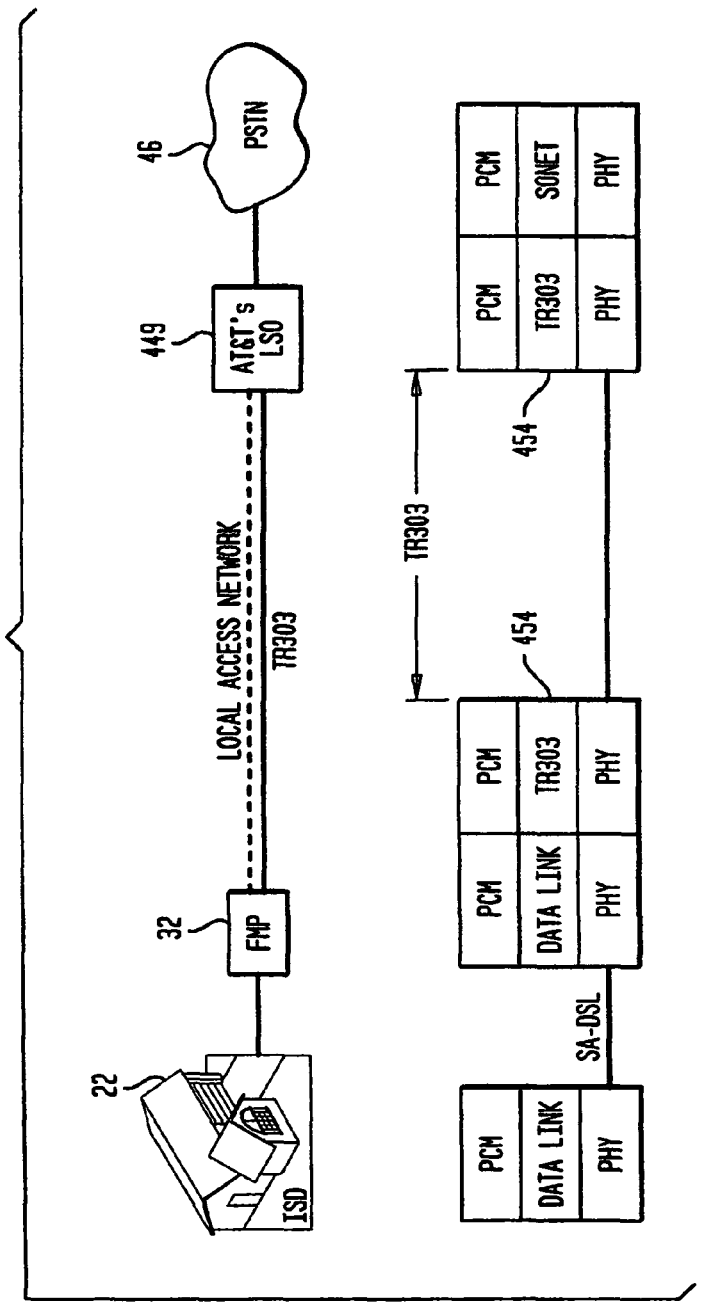
FIG. 15 illustrates the protocol hierarchy for voice services (option 2) employing the TR-303 interface.

FIG. 15 illustrates the protocol hierarchy for voice services (option 2) employing the TR-303 interface. The data link layer 454 in both the FMP 32 and the LSO 449 is supported by TR 303 across the local access network.

Figure 16:
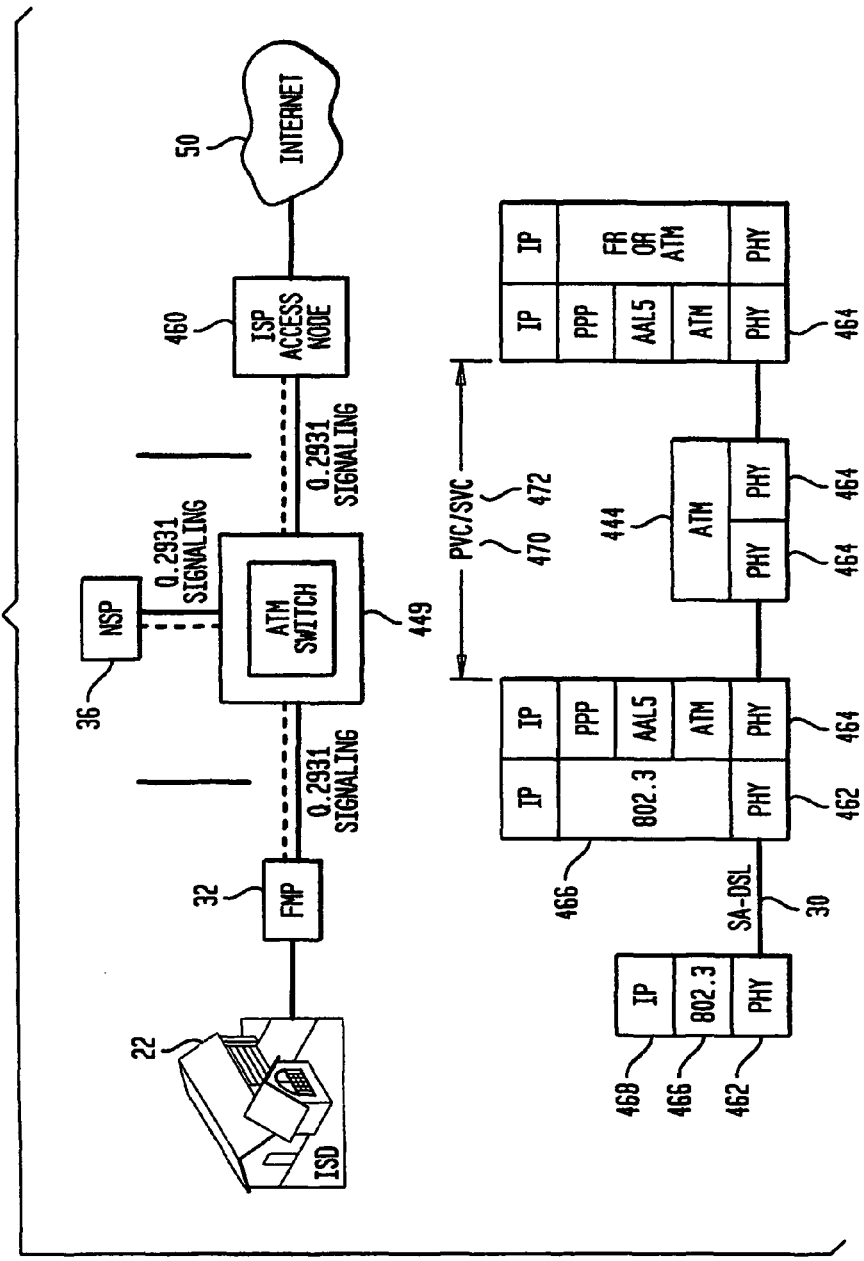
FIG. 16 illustrates the protocol hierarchy for data services employing point-to-point over ATM.

FIG. 16 illustrates the protocol hierarchy for data services employing point-to-point over ATM from the ISD 22 to the Internet backbone 50. The ISD 22 is connected to the FMP 32 by a self adaptive DSL 30 in the host-to-network layer. The Internet layer at the ISD 22 is supported by IEEE 802.3 [466] and the transport layer is supported by IP 468. At the FMP 32, IEEE 802.3 [466] between the physical layer and the Internet layer for connections between the FMP 32 and the ISD 22. For connections between the FMP 32 and the ATM switch 449, Q.2931 signaling is used. Between the FMP 32 and the ISP access node 460, a permanent virtual circuit (PVC) 470 can be established to save bandwidth associated with circuit establishment and tear down in those situations where certain virtual circuits must exist all the time. When these conditions do not exist, a switched virtual circuit (SVC) 472 can be established to dynamically establish a circuit on demand.

Figure 17:
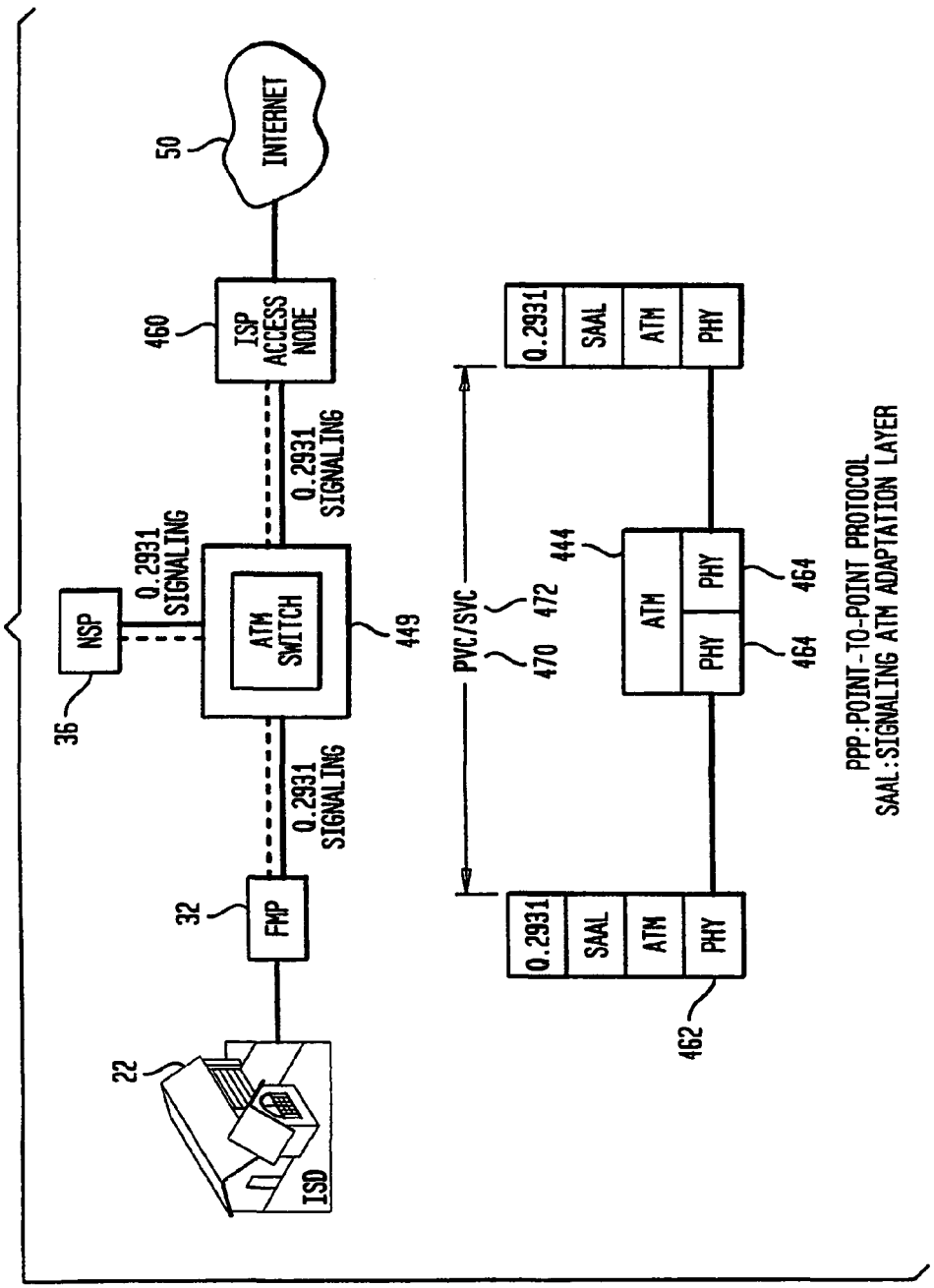
FIG. 17 illustrates the protocol hierarchy for data services using ATM signaling.

FIG. 17 illustrates the protocol hierarchy for data services using ATM signaling. FIG. 17 is similar to FIG. 16 in that both PVCs 470 and SVCs 472 can be established based on system requirements.

Figure 18:
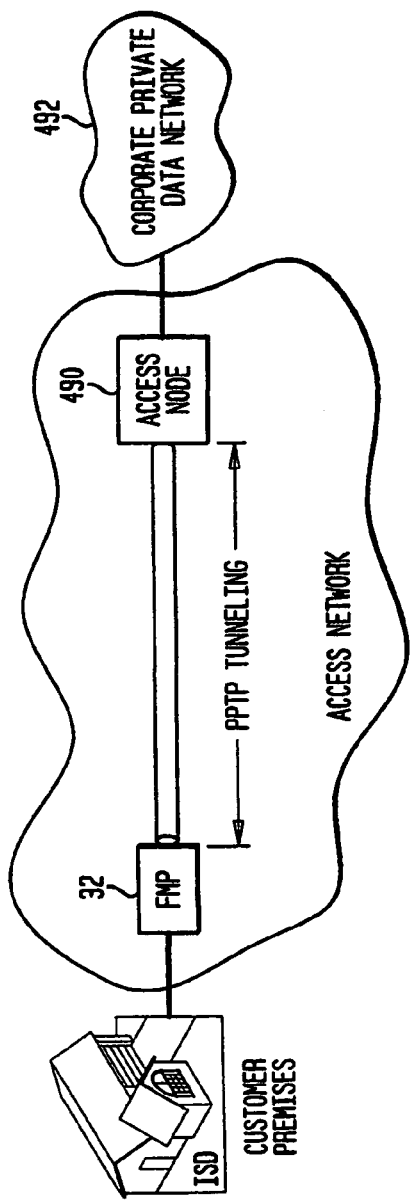
FIG. 18 illustrates the virtual private data network "Extranet."

FIG. 18 illustrates the virtual private data network "Extranet" between the FMP 32 and an access node 490 using point-to-point tunneling protocol. Point-to-point tunneling protocol wraps point-to-point packets in an IP format and uses a layer three protocol. The flexibility of point-to-point tunneling protocol allows the implementation to be client initiated or client transparent, but does require IP support. From the access node 490, users can connect to corporate private data networks 492 to create a secure connection between the customer services equipment and a private network.

Figure 19:
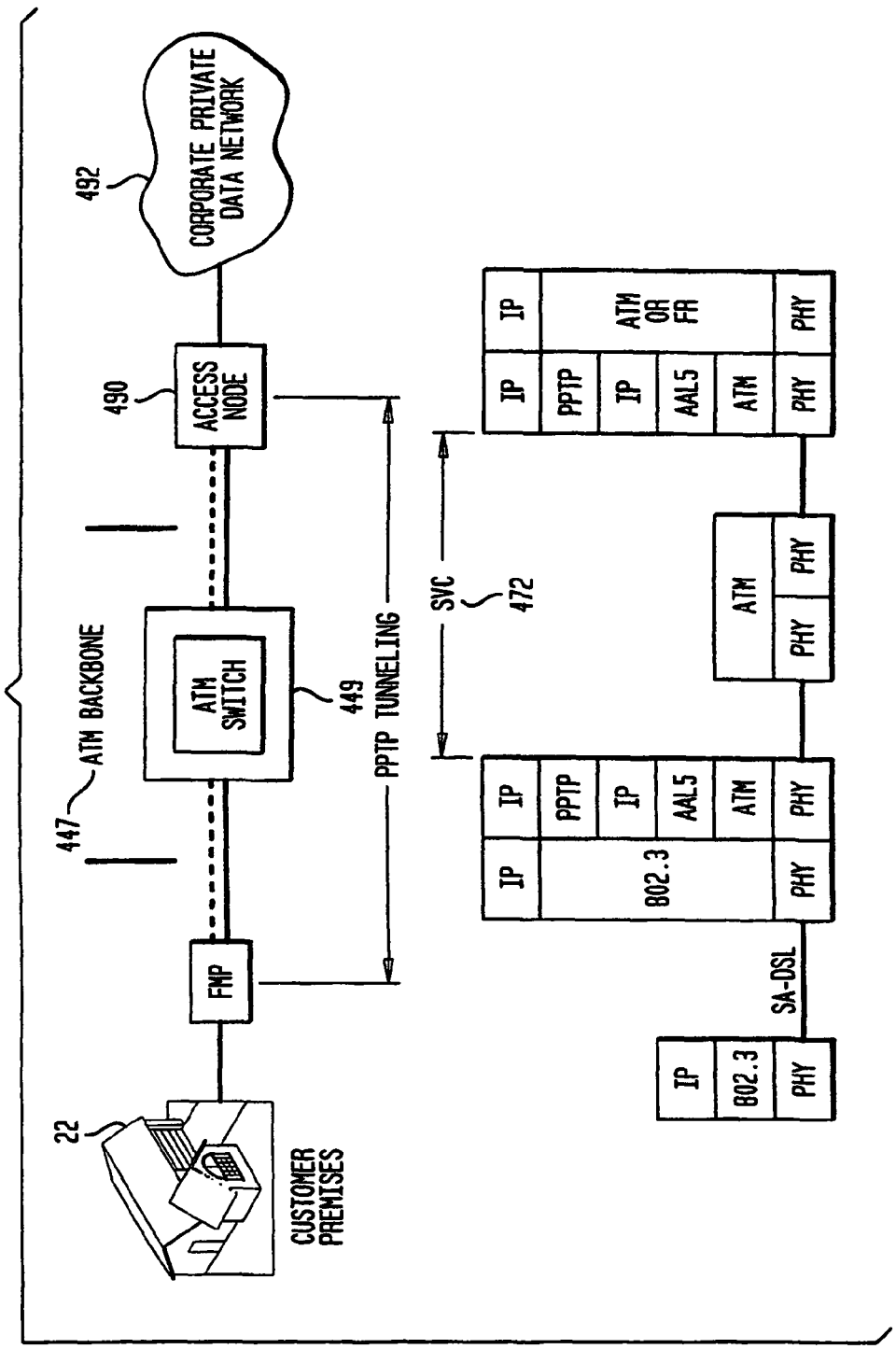
FIG. 19 illustrates the private data network "Extranet."

FIG. 19 illustrates the protocol hierarchy for establishing a point-to-point tunneling protocol from the customer services equipment to the private data network. The ISD 22 maintains a self adaptive DSL connection between the customer premises equipment and the FMP 32. Between the FMP 32 and the access node 490, data is sent along the ATM backbone via at least one ATM switch 449 in a switched virtual circuit (SVC) 472.

While exemplary systems and methods embodying the present invention are shown by way of example, it will be understood, of course, that the invention is not limited to these embodiments. Modifications may be made by those skilled in the art, particularly in light of the foregoing teachings. For example, each of the elements of the aforementioned embodiments may be utilized alone or in combination with elements of the other embodiments.

We claim:

1. A communications architecture comprising:
   at least one customer premises equipment interface device connected to one end of a wireless connection;
   a facilities management platform capable of separating voice signals from data packet signals and connected to another end of said wireless connection, the facilities management platform for interfacing with a plurality of different networks including a packet data network via a digital optical ring network;
   a router within the facilities management platform for transmitting data packet signals received from customer premises equipment to a packet data communications network simultaneously with transmitting voice signals received from customer premises equipment;
   a facilities interface within the facilities management platform capable of transmitting the voice signals to one or more external networks and receiving voice signals from the one or more external networks; and
   a network server platform coupled to said facilities management platform via said digital optical ring network for providing system management to the facilities management platform.

2. The communications architecture of claim 1 wherein said at least one customer premises equipment interface device comprises a multiplexer for multiplexing voice and data signals for simultaneous transmission over said wireless connection to said facilities management platform.

3. The communications architecture of claim 2, wherein the multiplexed voice and data signals are transmitted and received by the customer premises equipment interface device by a spread spectrum multiplexing scheme.

4. The communications architecture of claim 2, wherein the multiplexed voice and data signals are transmitted and received by the customer premises equipment interface device by a time division multiplexing scheme.

5. The communications architecture of claim 2, wherein the multiplexed voice and data signals are transmitted and received by the customer premises equipment interface device by a frequency division multiplexing scheme.

6. The communications architecture of claim 2, wherein the multiplexed voice and data signals are transmitted and received by the customer premises equipment interface device by an asynchronous multiplexing scheme.

7. The communications architecture of claim 2, wherein the multiplexed voice and data signals are transmitted and received by the customer premises equipment interface device by a synchronous multiplexing scheme.

8. The communications architecture of claim 1 wherein said digital optical ring network comprises a synchronous optical ring network.

9. The communications architecture of claim 1 wherein the voice signals are packetized voice signals.

10. The communications architecture of claim 1 further comprising at least one digital telephone connected to the customer premises interface device.

11. A communications architecture comprising:
    at least one customer premises equipment interface device connected to one end of a customer connection;
    a facilities management platform capable of separating packetized voice signals from data packet signals and connected to another end of said customer connection, the facilities management platform for interfacing with a plurality of different networks including a packet data network via a digital optical ring network;
    a router within the facilities management platform for transmitting data packet signals received from customer premises equipment to a packet data communications network simultaneously with transmitting packetized voice signals received from customer premises equipment;
    a facilities interface within the facilities management platform capable of transmitting the packetized voice signals to one or more external networks and receiving packetized voice signals from the one or more external networks; and
    a network server platform coupled to said facilities management platform via said digital optical ring network for providing system management to the facilities management platform.

12. The communications architecture of claim 11 wherein said at least one customer premises equipment interface device comprises a multiplexer for multiplexing voice and data signals for simultaneous transmission over said customer connection to said facilities management platform.

13. The communications architecture of claim 11 wherein said digital optical ring network comprises a synchronous optical ring network.

14. The communications architecture of claim 11 further comprising at least one digital telephone connected to the customer premises interface device.

15. The communications architecture of claim 11 further comprising at least one video telephone connected to the customer premises interface device.

16. The communications architecture of claim 11 further comprising at least one facsimile machine connected to the customer premises interface device.

17. The communications architecture of claim 11 further comprising at least one personal computer telephone connected to the customer premises interface device.

* * * * *